US012694438B2

(12) United States Patent
Erez et al.

(10) Patent No.: US 12,694,438 B2
(45) Date of Patent: Jul. 28, 2026

(54) GIFT TRANSACTION SYSTEM ARCHITECTURE

(71) Applicant: SYNCHRONY BANK, Stamford, CT (US)

(72) Inventors: Roy Erez, Stamford, CT (US); Alex Sirota, Stamford, CT (US)

(73) Assignee: SYNCHRONY BANK, Stamford, CT (US)

( * ) Notice: Subject to any disclaimer, the term of this patent is extended or adjusted under 35 U.S.C. 154(b) by 477 days.

(21) Appl. No.: 18/064,306

(22) Filed: Dec. 12, 2022

(65) Prior Publication Data

US 2023/0222562 A1     Jul. 13, 2023

Related U.S. Application Data

(63) Continuation of application No. 16/944,605, filed on Jul. 31, 2020, now Pat. No. 11,556,975, which is a
(Continued)

(51) Int. Cl.
*G06Q 30/0601*     (2023.01)
*G06Q 20/12*     (2012.01)

(52) U.S. Cl.
CPC ....... *G06Q 30/06331* (2025.08); *G06Q 20/12* (2013.01); *G06Q 30/0633* (2013.01); *G06Q 30/0641* (2013.01)

(58) Field of Classification Search
CPC ........... G06Q 30/0633; G06Q 30/0641; G06Q 20/12; G06Q 30/06331
See application file for complete search history.

(56) References Cited

U.S. PATENT DOCUMENTS 6,321,211 B1     11/2001  Dodd
6,360,254 B1     3/2002  Linden et al.
(Continued)

FOREIGN PATENT DOCUMENTS

EP        3284051       2/2018
WO      2014113608      7/2014
WO      2016168699     10/2016

OTHER PUBLICATIONS

Hyun-Hwa Lee, Jihyun Kim, (2009), "Gift shopping behavior in a multichannel retail environment: The role of personal purchase experiences", International Journal of Retail & Distribution Management, vol. 37 Iss: 5 pp. 420-439 (Year: 2009).*
(Continued)

*Primary Examiner* — Michael Misiaszek
(74) *Attorney, Agent, or Firm* — Polsinelli PC

(57)     ABSTRACT
A system architecture of a gift transaction system is disclosed. The gift transaction system can include a buyer interface module, a recipient interface module, a merchant backend interface module, a store front interface module, a curation module, a reminder module, an analytics module, or a media plug-in interface module. A method of operating the gift transaction system under the system architecture includes: providing an embedded widget on a website to determine gift intent to initiate a gift transaction by a buyer account for a recipient account; generating a gift buyer interface for a first client device to personalize a gift package including a gift item; generating a gift recipient interface for a second client device to customize the gift package; and communicating with a merchant backend system to complete the gift transaction to ship the gift package.

17 Claims, 15 Drawing Sheets

Related U.S. Application Data continuation of application No. 15/666,399, filed on Aug. 1, 2017, now Pat. No. 10,769,705, which is a continuation of application No. 13/794,375, filed on Mar. 11, 2013, now Pat. No. 9,773,273.

(60) Provisional application No. 61/754,497, filed on Jan. 18, 2013.

(56) References Cited

U.S. PATENT DOCUMENTS

| | | | |
|---|---|---|---|
| 6,859,791 B1 | 2/2005 | Spagna et al. | |
| 8,046,266 B1 | 10/2011 | Geller et al. | |
| 8,219,452 B2 | 7/2012 | Savilia et al. | |
| 8,239,275 B1* | 8/2012 | Lyren | G06Q 30/06 |
| | | | 705/26.1 |
| 8,249,916 B2 | 8/2012 | Gworek | |
| 8,478,661 B1 | 7/2013 | Kressler | |
| 8,606,721 B1 | 12/2013 | Dicker | |
| 9,773,273 B2 | 9/2017 | Erez et al. | |
| 9,858,612 B2 | 1/2018 | Erez et al. | |
| 10,068,280 B2 | 9/2018 | Erez et al. | |
| 10,275,822 B2 | 4/2019 | Erez et al. | |
| 10,540,360 B2 | 1/2020 | Erez et al. | |
| 11,195,144 B2 | 12/2021 | Erez et al. | |
| 2003/0042301 A1 | 3/2003 | Rajasekaran et al. | |
| 2003/0074471 A1 | 4/2003 | Anderson et al. | |
| 2007/0094066 A1 | 4/2007 | Kumar et al. | |
| 2007/0143189 A1 | 6/2007 | Mitchem | |
| 2008/0066114 A1 | 3/2008 | Carlson et al. | |
| 2008/0189188 A1 | 8/2008 | Morgenstern | |
| 2008/0195473 A1 | 8/2008 | Laramy et al. | |
| 2009/0043674 A1 | 2/2009 | Minsky et al. | |
| 2009/0063295 A1* | 3/2009 | Smith | G06Q 30/0603 |
| | | | 705/26.2 |
| 2009/0171804 A1 | 7/2009 | Lee et al. | |
| 2009/0259547 A1 | 10/2009 | Clopp | |
| 2010/0274567 A1 | 10/2010 | Carlson et al. | |
| 2010/0280879 A1 | 11/2010 | O'Sullivan et al. | |
| 2011/0196716 A1 | 8/2011 | Srinivasan et al. | |
| 2011/0218848 A1 | 9/2011 | Williams et al. | |
| 2011/0251925 A1* | 10/2011 | Savilia | G06Q 30/0641 |
| | | | 719/328 |
| 2011/0288961 A1 | 11/2011 | Boyington | |
| 2012/0031545 A1 | 2/2012 | Vaccaro et al. | |
| 2012/0066093 A1 | 3/2012 | Carpenter | |
| 2012/0123832 A1 | 5/2012 | Nicolaidis | |
| 2012/0150605 A1 | 6/2012 | Isaacson | |
| 2012/0203610 A1 | 8/2012 | Grigg et al. | |
| 2012/0226587 A1 | 9/2012 | De Lara | |
| 2012/0226588 A1 | 9/2012 | Wuhrer et al. | |
| 2012/0226590 A1 | 9/2012 | Love et al. | |
| 2012/0253972 A1 | 10/2012 | Oskolkov et al. | |
| 2012/0259547 A1 | 10/2012 | Morlock et al. | |
| 2012/0284149 A1 | 11/2012 | Carpenter | |
| 2012/0316983 A1 | 12/2012 | Shinnebarger et al. | |
| 2012/0330830 A1* | 12/2012 | Mason | G06Q 30/04 |
| | | | 705/41 |
| 2013/0006779 A1 | 1/2013 | Belluomini | |
| 2013/0030945 A1 | 1/2013 | Polt | |
| 2013/0073387 A1 | 3/2013 | Heath | |
| 2013/0073421 A1 | 3/2013 | Poisson | |
| 2013/0080447 A1 | 3/2013 | Ramer et al. | |
| 2013/0103538 A1 | 4/2013 | Scholl et al. | |
| 2013/0173424 A1 | 7/2013 | Kwon | |
| 2013/0211951 A1* | 8/2013 | Kalinin | G06Q 30/0241 |
| | | | 705/26.7 |
| 2013/0254074 A1 | 9/2013 | Joa | |
| 2013/0262336 A1 | 10/2013 | Wan et al. | |
| 2013/0268413 A1 | 10/2013 | Burr | |
| 2013/0332308 A1 | 12/2013 | Linden et al. | |
| 2014/0040059 A1 | 2/2014 | Barabas | |
| 2014/0156511 A1 | 6/2014 | Ren | |
| 2014/0201031 A1* | 7/2014 | Brooks | G06Q 30/0633 |
| | | | 705/26.8 |
| 2014/0207610 A1 | 7/2014 | Erez et al. | |
| 2014/0207628 A1 | 7/2014 | Erez et al. | |
| 2014/0207659 A1 | 7/2014 | Erez et al. | |
| 2014/0214626 A1 | 7/2014 | Bowers et al. | |
| 2015/0081457 A1 | 3/2015 | Agnes | |
| 2016/0103923 A1 | 4/2016 | Thomas | |
| 2016/0232480 A1 | 8/2016 | Erez et al. | |
| 2018/0040057 A1 | 2/2018 | Erez et al. | |
| 2018/0047086 A1 | 2/2018 | Erez et al. | |
| 2018/0165750 A1 | 6/2018 | Erez et al. | |
| 2018/0247367 A1 | 8/2018 | Erez et al. | |
| 2019/0080388 A1 | 3/2019 | Erez et al. | |

OTHER PUBLICATIONS

First Action Interview Pilot Program Pre-Interview Communication mailed Apr. 1, 2021 In U.S. Appl. No. 16/537,143.

HipHop Software and CloudPop Partner to Bring Advanced Gift Registry Solution to Merchants & Consumers; Award Winning ASP Integrates Leading Gift Registry Solution; Business Wire; New York; Sep. 6, 2000, pp. 1-3.

International Preliminary Report on Patentability issued Oct. 26, 2017 in International Application PCT/US2016/027894.

International Search Report and Written Opinion issued Apr. 28, 2014 in International Application PCT/US2014/011933.

International Search Report and Written Opinion issued Jul. 18, 2016 in International Application PCT/US2016/027894.

Notice of Allowance mailed Dec. 14, 2018 in U.S. Appl. No. 15/963,842.

Notice of Allowance mailed Dec. 30, 2016 in U.S. Appl. No. 13/794,509.

Notice of Allowance mailed Jul. 21, 2017 in U.S. Appl. No. 13/794,375.

Notice of Allowance mailed Jun. 18, 2019 in U.S. Appl. No. 16/189,226.

Notice of Allowance mailed May 1, 2020 in U.S. Appl. No. 15/666,399.

Notice of Allowance mailed May 23, 2018 in U.S. Appl. No. 15/796,720.

Notice of Allowance mailed Nov. 4, 2019 in U.S. Appl. No. 15/130,627.

Notice of Allowanced mailed Sep. 25, 2017 in U.S. Appl. No. 13/794,509.

Office Action mailed Apr. 13, 2015 in U.S. Appl. No. 13/794,375.

Office Action mailed Dec. 30, 2016 in U.S. Appl. No. 13/794,566.

Office Action mailed Jan. 25, 2019 in U.S. Appl. No. 16/189,226.

Office Action mailed Jan. 26, 2017 in U.S. Appl. No. 13/794,566.

Office Action mailed Jan. 6, 2016 in U.S. Appl. No. 13/794,509.

Office Action mailed Jul. 11, 2019 in U.S. Appl. No. 15/130,627.

Office Action mailed Jul. 13, 2017 in U.S. Appl. No. 13/794,509.

Office Action mailed Jul. 16, 2018 in U.S. Appl. No. 15/963,842.

Office Action mailed Jun. 13, 2016 in U.S. Appl. No. 13/794,566.

Office Action mailed Jun. 18, 2016 in U.S. Appl. No. 16/189,226.

Office Action mailed Mar. 13, 2015 in U.S. Appl. No. 13/794,509.

Office Action mailed Mar. 7, 2014 in U.S. Appl. No. 13/794,566.

Office Action mailed May 12, 2015 in U.S. Appl. No. 13/794,566.

Office Action mailed May 18, 2017 in U.S. Appl. No. 13/794,375.

Office Action mailed Nov. 20, 2015 in U.S. Appl. No. 13/794,375.

Office Action mailed Oct. 11, 2016 in U.S. Appl. No. 13/794,375.

Office Action mailed Oct. 15, 2014 in U.S. Appl. No. 13/794,566.

Office Action mailed Oct. 4, 2019 in U.S. Appl. No. 15/666,399.

Office Action mailed Oct. 4, 2019 in U.S. Appl. No. 15/782,529.

The Gift of Choice Ribbon, Available online at https://www.myribbongift.com/119063USAALLBROWSEAMWAY/Ribbon?content=Learn, Apr. 4, 2016.

Office Action mailed Jun. 25, 2021 in U.S. Appl. No. 16/537,143.

Notice of Allowance mailed Aug. 5, 2021 in U.S. Appl. No. 16/537,143.

Office Action mailed Sep. 16, 2021 in U.S. Appl. No. 16/357,852.

Retail: Online sellers work to make returns easy: [Home Edition]. Emling, Shelley, The Atlanta Journal—Constitution; Atlanta, GA, Dec. 27, 2002; F.1., Retrieved via ProQuest on Sep. 10, 2021.

(56) References Cited

OTHER PUBLICATIONS

Many Online Retailers Making Return Policies Easier to Lure More Customers Smiling, Shelly. Knight Ridder Tribune Business News: Washington, Dec. 27, 2002. Retrieved via ProQuest on Sep. 10, 2021.
Office Action mailed Mar. 31, 2022 in U.S. Appl. No. 16/940,795.
Office Action mailed Mar. 31, 2022 in U.S. Appl. No. 16/944,605.
Notice of Allowance mailed Apr. 26, 2022 in U.S. Appl. No. 16/357,872.
Notice of Allowance mailed Sep. 14, 2022 in U.S. Appl. No. 16/940,795.
Notice of Allowance mailed Sep. 15, 2022 in U.S. Appl. No. 16/944,605.
Chloe Albanesius, "Send Friends a Real Present with Facebook Gifts," PCT Magazine Online: NA. Ziff Davis, Inc., Sep. 27, 2012.
Notice of Allowance mailed Oct. 1, 2024 in U.S. Appl. No. 17/812,345.
Office Action mailed Dec. 7, 2023 in U.S. Appl. No. 17/509,399.
Notice of Allowance mailed Apr. 15, 2024 in U.S. Appl. No. 17/509,399.
Sanderson, Jennifer, "Technology puts more speed, less runaround into buying for others," Argus Leader, Nov. 26, 1999.
Office Action mailed Jun. 6, 2024 in U.S. Appl. No. 17/812,345.
Lehman, Hilary, "The go-to gift Gift cards the new 1-size-fits-all present," Daytona Beach News—Journal, Dec. 13, 2010.
Office Action mailed Jan. 15, 2026 in U.S. Appl. No. 18/769,832.
Najjar, Lawrence J., "Designing e-Commerce User Interfaces," crc, https://doi.org/10.1201/b10855-33, 2011, pp. 609-620.

* cited by examiner

100

300

| DETERMINING A GIFT INTENT | 302 |
| RECEIVING A GIFT SELECTION INDICATION | 304 |
| RECEIVING RECIPIENT CONTACT IDENTIFIER | 306 |
| GENERATING A GIFT ALERT | 308 |
| GENERATING AN ITEM SUGGESTION | 310 |

400

| GENERATING A RECIPIENT INTERFACE | 402 |

| GENERATING AN UP-SALE ITEM SET | 404 |

| RECEIVING AFFIRMATION OF GIFT ACCEPTANCE | 406 |

| RECEIVING A SHIPPING ADDRESS | 408 |

| GENERATING A THANK YOU NOTE | 410 |

| ADJUSTING THE INVENTORY | 412 |

| GENERATING A BUYER FEEDBACK ALERT | 414 |

500

DETERMINING AN EXCHANGE INTENT — 502

RECEIVING AN EXCHANGE ITEM SELECTION — 504

RECEIVING A SHIPPING ADDRESS — 506

NOTIFYING THE BUYER — 508

510 — GENERATING A GIFT BALANCE CREDIT

GENERATING A BALANCE INVOICE PAYMENT REQUEST — 512

GIFT TRANSACTION SYSTEM ARCHITECTURE

CROSS-REFERENCES TO RELATED APPLICATIONS

The present application is a continuation of U.S. patent application Ser. No. 16/944,605, filed Jul. 31, 2020, which is a continuation of U.S. patent application Ser. No. 15/666,399 filed Aug. 1, 2017, now U.S. Pat. No. 10,769,705, which is a continuation of U.S. patent application Ser. No. 13/794,375, filed on Mar. 11, 2013, now U.S. Pat. No. 9,773,273, which claims priority to U.S. Provisional Application 61/754,497, filed on Jan. 18, 2013, all of which are incorporated herein by reference in their entireties.

FIELD

This invention relates generally to an electronic commerce system, and in particular to an electronic commerce system with gift transaction management capability.

BACKGROUND

There are several ways to purchase and send gifts to friends and family, including purchasing an item directly in a store, purchasing the item online and delivering it to the gift recipient, reimbursing someone for purchasing a gift for him/herself, purchasing an item on a gift registry, or purchasing a gift card. Gift buying is a personal gesture. One where much thought and creativity goes into. When a buyer puts in the thought of selecting a gift on her/his own, the buyer cares about the perceived effort and thoughtfulness put into selecting the gift. The buyer wants the recipient to know that effort and thoughtfulness existed in the process and the buyer has specifically thought about the recipient when making the purchase.

In many cases, buyers wanting to purchase a gift online and send a personal and thoughtful gift are unable to do so due to constraints. For example, the constraints can include: not knowing exactly what to get and the social awkwardness of asking the recipient; not getting enough support at the time of purchase to find the 'right gift'; not knowing personal attributes such as size or color of a product; not knowing the physical address required to ship to the gift to; inability to get the gift they want delivered on time; etc. An alternative stemming from these constraints on a gift purchase could be purchasing a gift card. However, the gift card leaves the gift buyer unsatisfied and frustrated because the buyer could not convey the thoughtfulness in choosing a personal and unique gift and because the buyer is forced to highlight the amount given for the gift instead of the thoughtfulness of the gift. The recipient is sometimes also left unsatisfied with the gift or gift card, as there is a disappointment in the lack of effort and thoughtfulness put into the gift buying process on behalf of the buyer. When a buyer uses a gift registry or allows a recipient to select a gift on his/her own, the element of surprise is ruined.

In addition, recipients getting the wrong gift are left with the hassle of returning or exchanging the gifts, which is unpleasant. The thought of a return or an exchange may also frustrate the buyer knowing that they are purchasing a gift that most likely would be returned or exchanged.

Aside of the consumer, online merchants have high operational costs due to excess returns and exchanges. The online merchants further lose sales due to inability to complete transactions online due to the situations described above ending in shopping cart abandonment. Many merchants further lack brand awareness for being a gift destination as they carry items that are hard to gift, such as clothing or cosmetics. Even with the multitude of online gift cards and gift registry services, buyers and recipients are still left unsatisfied with the balance between personalization and ease of gift transactions.

SUMMARY

A system architecture of a gift transaction system is disclosed. The gift transaction system can include a buyer interface module, a recipient interface module, a merchant backend interface module, a store front interface module, a curation module, a reminder module, an analytics module, or a media plug-in interface module. Specifically, the media plug-in interface module can include a set of application programming interfaces (APIs) that provides external connection with third party content providers, applications, and websites. The buyer interface module is for providing a buyer interface to personalize a gift package. The recipient interface module is for providing a recipient interface to customize the gift package. The store front interface module and the media plug-in interface module are for integrating the buyer interface and the recipient interface with merchant websites or third-party websites, such as social media websites. The curation module is for determining product suggestions for either the buyer or the recipient. The reminder module is for maintaining customer loyalty by reminding previous users to come back to the gift transaction system by reminding them of gift giving opportunities, such as holidays, birthdays, anniversaries, or other social events. The analytics module is for building a business intelligence database to support at least the curation module or the reminder module.

Methods of operating a gift transaction system for facilitating gift transactions are also disclosed. Gift transactions can be initiated based on identification of an electronic account of the recipient, such as an email address, a social network account, or a virtual group association. The identification can include electronic contact information. Transaction is sealed based on a recipient interaction with the gift transaction system. Suggestions for potential gifts are generated based on past transactions of the buyer or the recipient, recipient social media account, buyer social media account, or any combination thereof. Inventory reservation/deduction can be made in response to the gift recipient accepting the gift. The gift transaction can place soft holds on items provided by a merchant system with an expiration time limit on the soft hold. Gift recipient upon receiving the gift, can decide to be taken to an exchange interface to exchange the gift in either the merchant store of the original gift or in a separate merchant store. The recipient can then be prompted to purchase other/additional products (upselling), which is a unique opportunity and benefit for both the merchant and the recipient.

The gift transaction can be provided through a stand-alone website and/or service, integrated within various destination websites, integrated within various merchant systems or websites, integrated in shopping cart or checkout processor systems, integrated within social media or social network systems, integrated within payment processors, or any combination thereof. The gift transaction system can be accessed via a custom application or via a web browser on any number of electronic devices capable of doing shopping online.

The gift transaction system includes various authentication methods to ensure that ease of gift sending does not compromise security nor fall into various spam filters or being ignored by the recipient as a spam or unauthorized message. Authentication can be achieved via pass-codes, secret questions, location-based identification, unique identifier such as email address or phone number. Authentication can be achieved via both active and passive means. For example, passive authentication may include the gift transaction system recording an indication, such as an image, a phrase, an audio clip, or a video clip, from the sender to make the recipient feel more comfortable to access the link or message regarding the gift. Passive authentication may also include restricting access to the gift based on a physical region to access the gift transaction system.

The gift transaction system disclosed enables a combination of flexibility, ease, previously only available to gift cards, and the thoughtfulness and gratitude of a gift selection process. Hence, the gift transaction system can have the benefits of both offline and online shopping capabilities and experience. The disclosed gift transaction system reduces shipping and exchange costs for retailers. Specifically, the gift transaction system enables savings for merchant that frequently deal with returns and exchanges by giving a gift recipient an opportunity to exchange, customize, or reject a gift prior to delivery. The gift recipient thus enjoys a surprising and immediate gratification of receiving a gift along with a guiltless ability to customize or exchange the gift without the need to go in-store or needing a gift-receipt. The gift transaction system also reduces shopping cart abandonment problem by reducing steps needed to send a gift and increases payment realization by leveraging social obligation. With the buyer being able to obligate him/herself to a purchase prior to payment and inputting of shipment address, the merchants who utilize the gift transaction system can increase sales, customer acquisition, and customer loyalty. The gift transaction system also enables the retailers to send out of stock items as gifts. The gift recipients are able to know that they have received a gift before the gift item actually becomes available.

Further, some embodiments of the gift transaction system enable a higher level of privacy in the social gifting activities. For example, the gift transaction system allows for a recipient to receive a gift without giving out his/her address. This may be beneficial in online dating situations, used item sales (e.g., eBay™ or Craigslist™), or customers who would like to protect the privacy of home addresses from spam.

Some embodiments of the gift transaction system further enables a gift giving service that align with the modern day etiquette. For example, the gift transaction system can send a gift or a thank you letter or video-message without having to bother the recipients for their address. The gift transaction system can also preserve the element of surprise by having the recipient see the gift or a representation of the gift along with a gift letter. The gift transaction system yet further enables mass gifting gestures, eliminating the need of the sender to individually obtain shipping addresses from recipients.

Some embodiments have other aspects, elements, features, and steps in addition to or in place of what is described above. These potential additions and replacements are described throughout the rest of the specification.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
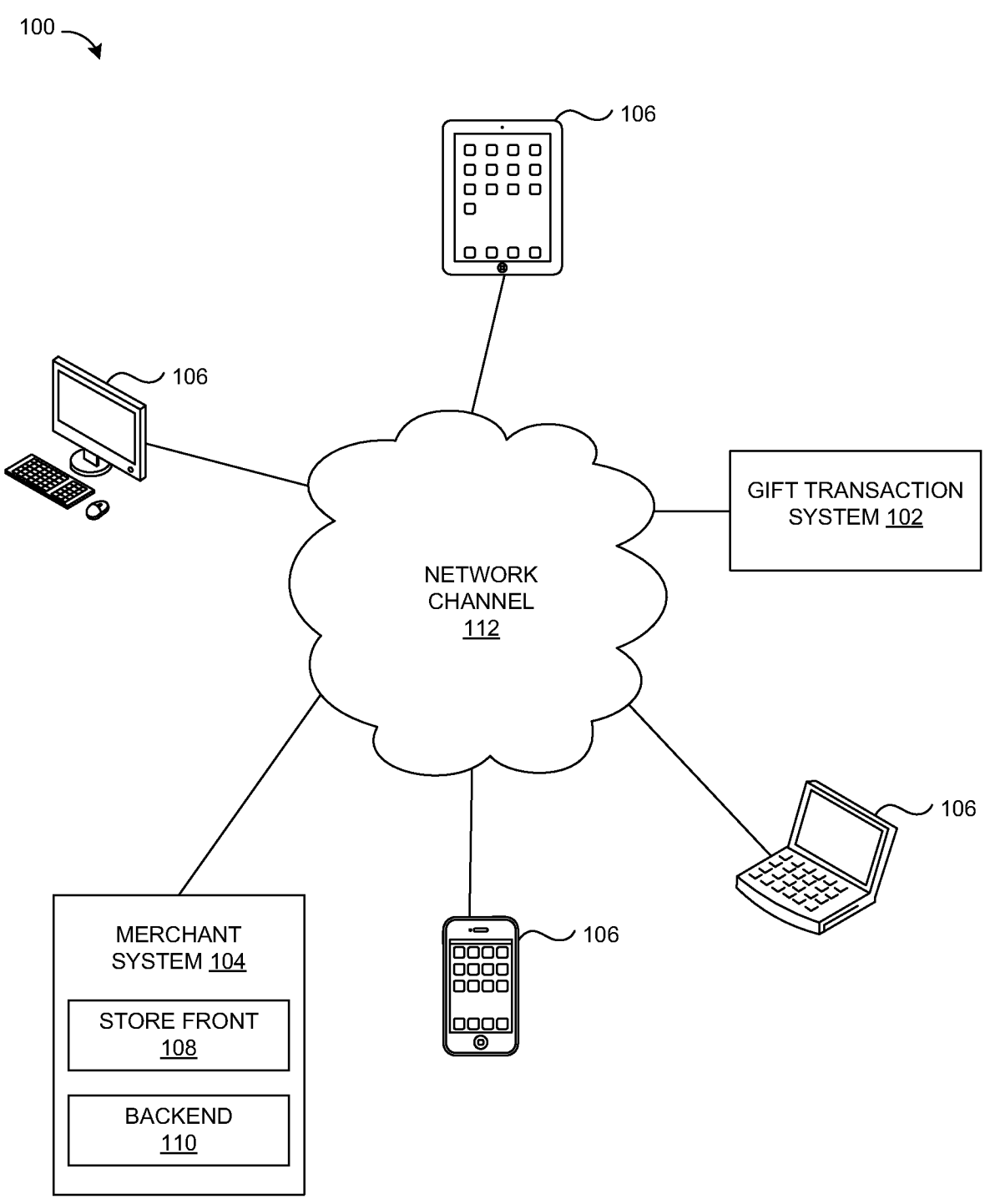
FIG. 1 illustrates a system environment of a gift transaction system.

FIG. 1 illustrates a system environment 100 of a gift transaction system 102. The gift transaction system 102 is a computer system configured to provide a gift sending platform between two or more consumers via one or more merchant systems, such as a merchant system 104. The gift transaction system 102 can be a computer system or an electronic system with computer functionalities as described in FIG. 15. The merchant system 104 is a computer system configured to provide an interface for buyers to make and process transactions for properties, products, or services provided from a merchant. The merchant system 104 can be a computer system or an electronic system with computer functionalities as described in FIG. 15.

A buyer via one of the client devices 106 can access a store front 108 of the merchant system 104. The store front 108 is a merchant interface generated by the merchant system 104 for buyers to make transactions for properties, virtual goods, products, or services of the merchant. The buyer can initiate a gift transaction via the store front 108. The store front 108 can add flags to the item pages to make the item eligible or ineligible for gifting. The store front 108 can have a default of no gifting available, and only flagged items are eligible for gifting. Alternatively, the store front 108 can have a default of gifting capability, and only flagged items are not eligible for gifting. The flags can be determined based on a set of logic defined by product type, user profile, user interaction with the store front 108, or any combination thereof.

In this disclosure, a buyer of a gift transaction is presumed to be the gift sender and the person attributed to be responsible for sending the gift. However, it is understood that the gift transaction system 102 can handle a situation where those three entities are related but not the same. For example, an actual gift sender operating with the gift transaction system 102 may be an assistant of a buyer, who is paying for the gift item, and the gift notice may attribute the gift source as the husband of the actual buyer. The recipient in this disclosure can be the person the gift is intended for or an agent of the person the gift is intended for, such as a parent or a husband.

The buyer can access a buyer interface generated by the gift transaction system 102 and shown on one of the client devices 106. The buyer interface can be embedded on the store front 108 to facilitate a gift transaction. The gift transaction can be a close loop transaction that only allows the buyer to send a gift item from a single store and the recipient to exchange the gift within the single store. The gift transaction can also be an open loop transaction that allows the buyer to purchase from multiple store fronts and the recipient can exchange through multiple store fronts.

Upon confirming sending a gift, a recipient can accept the gift item via a recipient interface generated by the gift transaction system 102. The recipient interface including an exchange interface can be shown on a recipient device. The recipient device can be one of the client devices 106. The client devices 106 are electronic devices capable of communicating with the store front 108 and the gift transaction system 102. The client devices 106 can include tablets, laptop computers, desktop computers, mobile phones, smart phones, electronic kiosks, electronic accessories, smart vehicles, smart appliances, smart TV, point of sale terminals, game consoles, or any combination thereof.

The merchant system 104 can also include a backend engine 110. The backend engine 110 is configured to process the transactions made via the store front 108. The backend engine 110 can track inventories, track orders, authorize payments, and perform other transaction related processes.

The merchant system 104, the gift transaction system 102, and the client devices 106 can communicate with each other through a network channel 112. The network channel 112 can include one or more communication networks that can be linked together, including any combination of local area and/or wide area networks, using both wired and wireless communication systems. The network channel 112 can include point-of-sale networks, TV cables, Ethernet cables, phone lines, local area networks, cellular networks including SMS network, or any combination thereof. In one embodiment, the network channel 112 uses standard communications technologies and/or protocols. Thus, the network channel 112 may include links using technologies such as Ethernet, 802.11, worldwide interoperability for microwave access (WiMAX), 3G, 4G, CDMA, digital subscriber line (DSL), etc. Similarly, the networking protocols used on the network channel 112 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over the network channel 112 may be represented using technologies and/or formats including hypertext markup language (HTML) or extensible markup language (XML). In addition, all or some of links can be encrypted using conventional encryption technologies such as secure sockets layer (SSL), transport layer security (TLS), and Internet Protocol security (IPsec).

Multiple buyers and/or multiple recipients and/or multiple gift items can belong to a single gift transaction. For example, a buyer can initiate a gift transaction. Other buyers can then add their contribution to the gift transaction for the same recipient or recipients. In another example, a buyer can purchase a gift item for a family of recipients, where the gift transaction is not completed without approval from all of the recipients. In yet another example, a buyer can purchase a bundle of gifts for a recipient. The bundle of gifts can be configured by either the buyer or the merchant. The bundle of gifts can include different items and services from different merchants. Multiple buyers can also add to the original gift transaction for the recipient, whether adding money or adding products to the bundle of gifts. A gift "item" in this disclosure is defined as a property, a service, a product, an option, or other derivatives sold by a merchant. For example, gift items can include movies, music files, digital rights management licenses, spa/massage services, coffee shop coupons, vacation vouchers, vacation home rentals, proof of charity donation, flight tickets, sports game tickets, physical items, vehicles, or any combination thereof. The gift item can have a single monetary value for exchange purposes or have a range of values for exchange purposes. A "buyer" in this disclosure is defined as one or more persons or entities responsible for purchasing a gift. However, it is understood that the buyer can specify in the gift transaction that the gift-giving person(s) is intended to be someone else. A "recipient" in this disclosure is defined as one or more persons or entities receiving the gift, including a charity entity.

Figure 2:
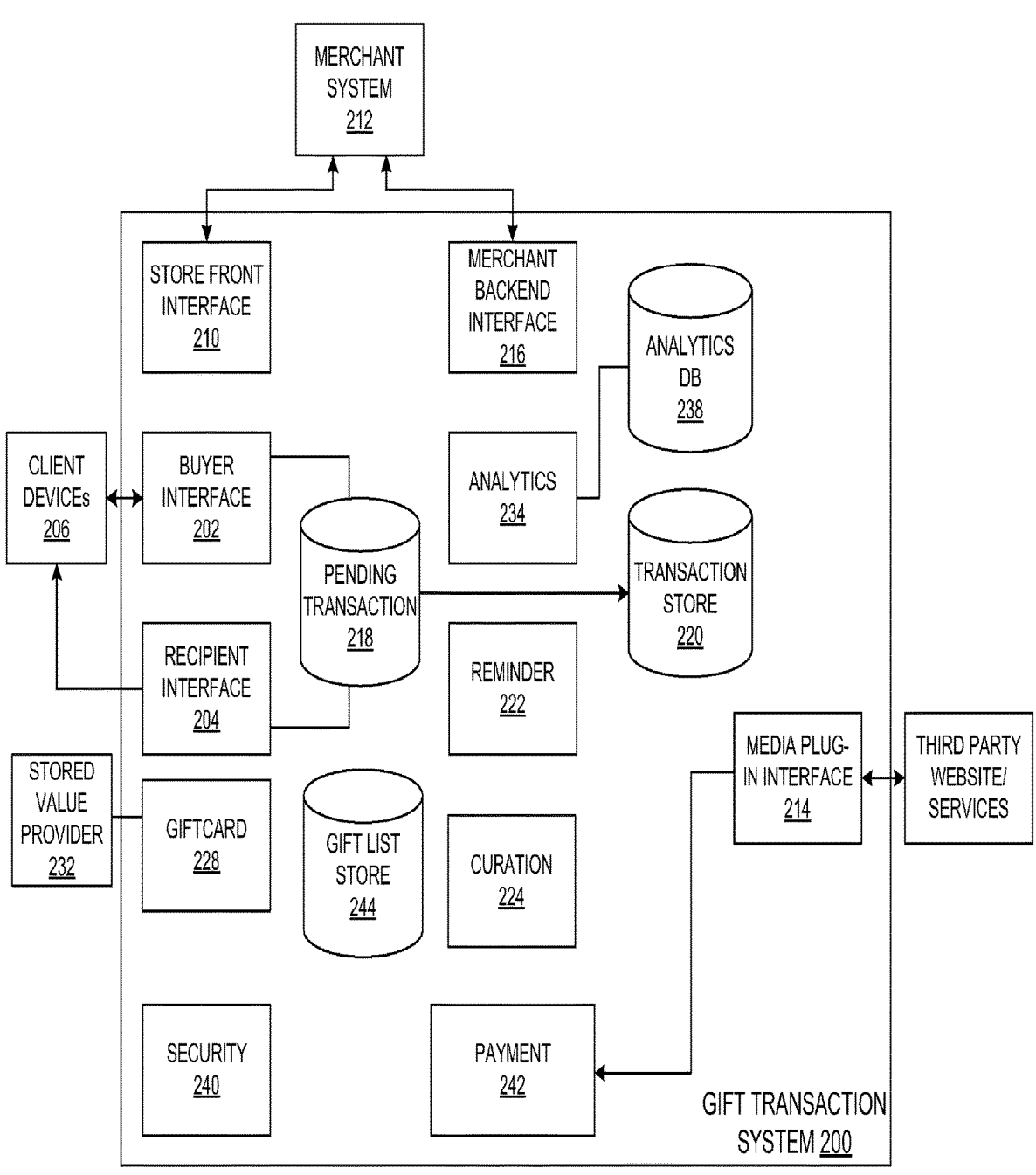
FIG. 2 illustrates a control flow of a gift transaction system.

FIG. 2 illustrates a control flow of a gift transaction system 200. The gift transaction system 200 can be the gift transaction system 102 of FIG. 1. The gift transaction system 200 can include one or more methods of facilitating a gift transaction. The one or more methods can be implemented by components, storages, and modules described below. The modules can be implemented as hardware components, software modules, or any combination thereof. For example, the modules described can be software modules implemented as instructions on a non-transitory memory capable of being executed by a processor or a controller on a machine described in FIG. 15.

Each of the modules can operate individually and independently of other modules. Some or all of the modules can be combined as one module. A single module can also be divided into sub-modules, each performing separate method step or method steps of the single module. The modules can share access to a memory space. One module can access data accessed by or transformed by another module. The modules can be considered "coupled" to one another. The modules can share a physical connection or a virtual connection, directly or indirectly, allowing data accessed or modified from one module to be accessed in another module, as illustrated by the line or arrow connections in FIG. 2.

The storages or "stores", described in this disclosure are hardware components or portions of hardware components for storing digital data. Each of the storage can be a single physical entity or distributed through multiple physical devices. Each of the storage can be on separate physical device or share the same physical device or devices. Each of the stores can allocate specific storage spaces for run-time applications.

The gift transaction system 200 can include additional, fewer, or different modules for various applications. Conventional components such as network interfaces, security functions, load balancers, failover servers, management and network operations consoles, and the like are not shown so as to not obscure the details of the system.

The gift transaction system 200 includes a buyer interface module 202 and a recipient interface module 204. The buyer interface module 202 is configured to generate an interface on the client devices 206 for a buyer of a gift. The client devices 206 can be the client devices 106 of FIG. 1. The buyer interface module 202 can be presented as a mobile phone application, a webpage, an embedded widget within a webpage, a POS terminal interface, a kiosk interface, a gaming console interface, or any combination thereof.

The gift transaction system 200 includes a store front interface 210. The store front interface 210 is configured to embed access to the buyer interface module 202 in a store front of a merchant system 212. In some embodiments, the merchant store front can define where a link to the buyer interface can appear. In other embodiments, the buyer interface module 202 has logics defining where in the webpage structure of the merchant store front, such as DOM structure, to place the buyer interface. The store front interface 210 can access an Application Programming Interface (API) of the merchant system 212, and provide access to the gift transaction system 200 via an API. The store front interface 210 can provide access to the buyer interface from the merchant store front with minimal modification to the merchant store front, such as the store front 108 of FIG. 1. For example, the store front interface 210 can facilitate access to the buyer interface via browser-side script on the website of the merchant. The gift transaction system 200 can modify the merchant store front via the store front interface 210. The merchant system 212 can also modify the buyer interface module 202 via the store front interface 210. The store front interface 210 can perform gift intent analysis to determine when to activate the buyer interface module 202 for the buyer. The gift intent analysis can be based on navigation to gift section pages of the store front, searching for products that do not fit the buyer profile, interest in gift related user interface (UI) elements, or signals from other social media services. The level of gift intent can be used to modify the buyer interface, such as making gift suggestions, customizing website messages, making gift-related UI elements more prominent, or suggesting a gift section of the merchant store front.

The buyer interface can be integrated within a merchant store front via the store front interface 210. The store front interface 210 can add, change, or remove user interface elements, gift buttons, and display the buyer interface overlay over or embedded within the store front interface 210. The store front interface 210 can modify the checkout process of the merchant system 212, such as removing shipping address and payment information questions from the checkout flow.

The gift transaction system 200 also includes a media plug-in interface module 214. The media plug-in interface module 214 can be an API for a third-party website, such as a social media service or a destination website. For example, the media plug-in interface module 214 can link third-party websites and services to the buyer interface module 202. Further, the media plug-in interface module 214 can also access the social media service to download social graph information related to either the buyer or the recipient from the social media service. For another example, the media plug-in interface module 214 can link the buyer interface module 202 to the destination websites, such as a link or an embedded widget of the buyer interface on social blogging websites, the Pinterest™ website, social media websites, auction websites, ancestry history websites, dating websites, or other websites. The buyer interface module 202 can provide a script to embed access to the buyer interface as a gifting widget within the third party websites.

The media plug-in interface module 214 can further facilitate followers of celebrities to send real gifts to the celebrities via social media websites. The followers need not to have the actual shipping address of the celebrities. The followers (i.e., buyers) can initiate a gift transaction via the buyer interface. The buyer interface can provide to the follower a link to a gift notification page. The link can be manually or automatically posted on social media networks such as Facebook/Twitter. While links to the gift transactions can be broadcasted publicly, only the intended recipient can claim the gift item and receive it after authentication using an underlying social network connected to the gift transaction system 200 via the media plug-in interface module 214. The public can either only view the gift item or the link would show nothing to a viewer who is not the intended recipient, where preference of such would be set by the buyer or be pre-set by a system-wide setting. The inverse can also apply to the gift transaction system 200 where gifts from a celebrity can be sent out to the followers of the celebrity on a social media network without the need for a shipping address or a contact email. The celebrity can share a link generated from the buyer interface, and restrict claiming of the gifts to followers of the celebrity account on a social media network, such as Twitter™ or Facebook Pages. In another example, an organization can authorize the human resource department or management to send employee gifts in an electronic way, or for employees to send to other employees gifts (such as a manager-employee relationship within an organization) without knowing the recipient's physical address.

The buyer interface module 202 can be activated when gift intent is detected in the store front interface 210. Once the gift intent is detected, the store front interface 210 can be set to a gift mode. In the gift mode, the buyer interface module 202 can readily generate the buyer interface to select items to send to potential recipients. The buyer interface module 202 can enable immediate sending off of gifts by reducing the steps needed for the gift sending process. A gift can be sent by receiving a selection of at least one gift and receiving a contact point for the recipient. The contact point can be an email address of the recipient or a social media account. Hence the buyer interface module 202 enables a way to send real gifts without knowing the shipping address of the recipient. The buyer interface module 202 can also initiate sending of a gift item prior to payment.

The buyer interface module 202 through the buyer interface enables the buyer to define the gift, including bundled gift items. The buyer interface module 202 allows the buyer to specify an overall exchange budget aside from selecting a gift item. The buyer interface module 202 allows the buyer to select the gift item without fully customizing the gift item. For example, the gift item can be sent without knowing the color preference or size of the gift item. The full customization can be left to the recipient interface module 204.

If the buyer interface module 202 provides the buyer interface to a device with a camera, the buyer interface module 202 can facilitate snapping a picture of an item at a store to initiate a gift transaction. The picture can be part of a gift greeting page/card to be sent together with the gift item notice. The buyer interface module 202 can also facilitate snapping a picture of a product identifier, such as UPC code, to be used to select the gift item via a merchant backend interface module 216. The gift item notice can then be generated from the gift item identified by the product identifier.

The gift greeting page/card can be personalized by a buyer, including personalized message, background, multimedia effects, pictures, photographs, animations, video clips, sound bites, or any combination thereof. The gift greeting page/card can also be generated based on templates pre-determined on the buyer interface module 202. For example, the gift greeting page/card by default can include a photo of the gift item from either the buyer's device or from the merchant store front. For another example, the gift greeting page/card can include an advertisement from the manufacturer or reseller of the product. Because advertisements of products and services are well thought out messages appealing to consumers on an emotional level, a connection between a pre-existing advertisement multimedia and gifts broadens the reaches of market branding of such products or services.

Once a gift greeting page/card along with a gift notice has been sent, the buyer interface module 202 can store the pending gift transaction on a pending transaction store 218. The gift greeting page/card along with the gift notice generated can be sent over to a recipient contact point including an email account, a social media/network account, a cellular phone message center (e.g., SMS or WhatsApp™), or any combination thereof. The gift greeting page/card can also be printed out via a printer coupled to the client devices 206. A website link to the recipient interface module 204 can be provided on the gift card.

The recipient interface module 204 is configured to generate an interface for a gift recipient, where the interface is accessible from the client devices 206. The recipient interface module 204 can generate a gift recipient interface as a mobile phone application, a webpage, an embedded widget within a webpage, a POS terminal interface, a kiosk interface, a gaming console interface, or any combination thereof.

The recipient interface module 204 can provide to the gift recipient an interactive gift notification sent to the contact point (e.g., email address) of the recipient. For example, the recipient interface module 204 can render the gift notification and any multimedia attachment. For example, the gift notification can include greeting text, audio message, or video message from the buyer. The gift notification can also include marketing material associated with the gift item or tutorial information associated with the gift item. This content can come from the online store, a database storage of the gift transaction system 200, or a third party content provider that has access to the gift transaction system 200 through various APIs or other means. The recipient interface module 204 can receive and store a gift list from the gift recipients.

The buyer interface module 202 and the recipient interface module 204 can provide post-gift-transaction management, such as a list of previously received gifts and from whom the gift was sent. Either the buyer or the recipient can review this information to determine whether they should be returning a social favor, and whether it is socially appropriate to send or re-send a gift item. Suggestions to return the social favor can also be generated on the buyer interface or the recipient interface.

The buyer interface module 202 and the recipient interface module 204 can iteratively optimize up-sale items and UI elements in the gift transaction process by reconfiguring the up-sale items and the UI elements for different buyers and recipients to maximize transactions.

The gift transaction system 200 includes a transaction store 220. The transaction store 220 is a database containing completed gift transactions that has passed through the gift transaction system 200. The transaction store 220 can be accessed by the merchant system 212 or other third-party services via an API.

The gift transaction system 200 includes the merchant backend interface module 216. The merchant backend interface module 216 is configured to access databases of the merchant system 212, such as the merchant system 104 of FIG. 1. Specifically, the merchant backend interface module 216 can provide access to the backend engine 110 of FIG. 1. The merchant backend interface module 216 can also be configured to provide an application programming interface (API) for the backend engine 110 to provide access to the gift transaction system 200. For example, the merchant system 212 can push updates regarding delivery of gift items to the gift transaction system 200 and the gift transaction system 200 can request inventory information of particular items from the merchant system 212. The merchant backend interface module 216 enables extraction of product information, photographs, pricing, availability, dimensions, and colors from the merchant system 212 in run-time. The merchant backend interface module 216 can facilitate generation gift cards compatible with the merchant system 212 and/or with other stored value providers programmatically.

The gift transaction system 200 includes a reminder module 222. The reminder module 222 is configured to generate a reminder message to potential buyers to purchase gifts. The reminder message can be generated for specific recipients, for specific occasions, with specific gifts, or any combination thereof. The reminder message can be sent via email, cellular message, mobile application notification, social media services, physical delivery, browser pop-up, or any combination thereof. The reminder module 222 can be coupled to the media plug-in interface module 214 to access social graph information of a potential buyer from a social media service, such as Facebook™.

For example, the reminder module 222 can determine whether to generate a reminder message based on relationship strength between a buyer and a recipient, urgency of a special occasion, profile information of the buyer or the recipient, privacy setting of the buyer or the recipient, gift-related configuration of the buyer or recipient account, or any combination thereof. The relationship strength can be provided by the social graph, can be based on the number of mutual friends, the number of gift transactions between the buyer and the recipient, or other heuristic related to the transaction store 220 and/or the social graph. The reminder module 222 can provide a discount to a gift transaction initiated from the reminder message.

The reminder module 222 can also be configured to re-connect with a gift recipient to manage any pending gift transactions or recently completed gift transactions. For example, the reminder module 222 can send reminders to the recipient of a gift item to open the gift alert to accept or exchange the gift item. The reminder module 222 can also inform the recipient and/or the buyer when the price of the item is about to change, such as within 16 hours.

The reminder module 222 can be configured to avoid spam filters and improve readability. For example, the buyer or gift sender name can be place in every message to the recipient and vice versa. Personal languages and greetings input should be encouraged in the buyer interface module 202 and the recipient interface module 204 to personalize reminder messages. Consecutive messages can be differentiated by different phrasing and/or language structure and size. The reminder module 222 can allow the buyer or the recipient to personalize each message sent prior to sending. For completed gift transactions, the reminder module 222 can provide tutorials or product branding videos to the recipients to enhance the user experience of the gift transaction system 200.

The gift transaction system 200 includes a curation module 224. The curation module 224 is configured to provide item recommendations to the buyer through the buyer interface module 202 or to the recipient through the recipient interface module 204. The item recommendations can be based on business intelligence and user taste profiling generated by the gift transaction system 200 as described below. The item recommendations can also be based on proprietary information from the merchant system 212.

The gift transaction system 200 includes a gift card module 228. The gift card module 228 can be coupled to a stored value provider 232. The gift card module 228 is configured to generate a gift card with stored value for a recipient. The gift card module 228 can generate the gift card in response to the recipient interface module 204 detecting a positive balance after an exchange of a gift item has occurred. The gift card module 228 can include specific gift associated with the gift card. The gift card can include one or several gift item alternatives. The gift card module 228 can also include videos, photos, tutorials, interactive greetings, or any combination thereof. A physical version of the gift card can be printed with a link to access the electronic contents for the gift card.

In one embodiment, the gift card generated can have three states: clean, registered, or paid for. In the clean state, the gift card has a barcode and a product or store information, but there is no sender/recipient information, no custom greeting, and no payment balance. In the registered mode, the gift card has sender/recipient information in addition to the other information in the clean mode, but the gift card has no payment balance. In the paid for mode, the gift card has a payment balance and has all of the information in the registered mode. Either a buyer or a recipient of the gift card can register the gift card in clean mode and convert it to the registered mode. The buyer then can be contacted by the gift transaction system 200 to make payment for the payment balance of the gift card. Once payment is received, the gift card is changed to the pay-for mode.

The gift transaction system 200 includes an analytics module 234. The analytics module 234 is configured to analyze user interactions through the gift transaction system 200, including social media systems and merchant systems connected to the gift transaction system 200. The analytics module 234 can also be configured to calculate relevant behavioral trends regarding each recipient and each buyer relative to each merchant. The analytics module 234 can record both the interaction analysis and behavioral trends, such as recording the analysis and trends in an analytics database store 238.

The analytics module 234 can generate user-based analytics databases as well as gift-item-based (product based or service based) analytics databases in the analytics database store 238. These databases can be based on an analysis of the transaction store 220 combined with social graph information from a social media service via the media plug-in interface module 214. The databases in the analytics database store 238 can also be combined with proprietary information from a specific merchant via the merchant backend interface module 216. For example, the interaction analysis can include strength of relationships between the buyer and the recipient. For example, the behavioral trends can include the most likely product for the recipient and the buyer to purchase. The behavioral trends can also include the likelihood that a social event (e.g., birthdays) associated with a buyer account stored on a social media website accessed through the media plug-in interface module 214 is likely to generate a gift transaction.

Gift item related analysis can include preferred products per specific users or profiles, end to end product cycle, upselling analysis including amount, type of events, and type of products that maximizes up-sales, or any combination thereof. The product related analysis can be used to generate recommendation feeds on the buyer interface module 202 or the recipient interface module 204. Product related analysis can also include exchange rates of each product, such as which products are being exchanged by recipients more frequently, as well as analyzing attributes of products or links between type of products that are being exchanged to and from other type of products.

Gift item related analysis includes calculation of a giftability score. The giftability score is used by the gift transaction system 200 to sort products and services by their fit for being a good gift. The giftability score serves to better predict whether a certain gift item would make a good gift in the eyes of consumers. The analytics module 234 can record which gift items are the most popular for being sent as gifts. The analytics module 234 can also record which gift items are more likely to be accepted by the recipient versus being exchanged. The analytics module 234 can further record which gift items are frequently selected as a replacement item in a gift exchange. The analytics module 234 can calculate a weighted average of the above metrics. Other gift-related signals can also be added to the weighted average, such as time to gift acceptance, time to exchange, and etc.

User-based analytics can be used to modify the giftability score. For example, a modified giftability score can be calculated based on user-specific demographics. User-specific demographics can includes geographical regions of the buyer or recipient, age range of the buyer or recipient, taste profiles of the buyer or recipient, social networks of the buyer or recipient, profile information of the buyer or recipient, other buyer or recipient profile information, or any combination thereof. The specific taste profile can be determined based on past purchases, past exchanges, social network explicit or implicit connections (e.g., Facebook™ likes), website broadcasts (e.g., tweets via Twitter™ and pins via Pinterest™), personal attributes entered and/or known by either the buyer or the recipient, or any combination thereof. The modified giftability score can also be calculated based on a personalized behavior trend. The user-specific demographics and the user-specific behavior trend can include adjustments to the general giftability score of the gift-item. This user-specific demographic or personalization adjustment can be calculated in real-time as a buyer interface is generated, or pre-calculated asynchronously from the real-time purchase. Sorting by gift item centric giftability score, demographic-specific giftability score, or personalized giftability score would allow progressively better gift recommendation and curation to occur.

The giftability score can be used by the buyer interface module 202 to present products and services as potential options as a gift item. The giftability score can be used by the recipient interface module 204 to present products and services as potential options for gift exchanges. The giftability score can be used by the curation module 224 to sort the item recommendation list generated by the curation module 224. The giftability score can further be used by the reminder module 222 to determine gift item recommendations for specific gifting reminders.

The analytics module 234 can generate valuable business intelligence including conversion rate of reminder messages from the reminder module 222, up-sale rates from recommendation feeds of the curation module 224, buyer purchasing profile, recipient purchasing profile, recipient gift exchange rate and preference, social graphs of the buyer or the recipient, other monetization metrics from the merchant system 212, or any combination thereof.

The analytics module 234 can generate a gift social graph amongst user accounts. The gift social graph can be a modification of a social graph retrieved from a social media service. The gift social graph can define relationships and interactions between user accounts. The strength of the relationship can be calculated as described above, further including amount and price of gift items in gift transactions. The gift social graph can include a profile of each user account.

The analytics module 234 can generate a taste profile for different user types, such as gender, age, or geographical location. The analytics module 234 can identify user types based on grouping of gift transaction data. Each taste profile is then associated with preferred brands and/or product categories. Personal information is aggregated into the taste profiles that drive the recommendation feed of the curation module 224. The merchant system 212 can have access to the analytics database store 238 to utilize the business intelligence to improve monetization of the merchant sales.

The analytics database store 238 can further include a shipping address database that associates shipping addresses with email addresses, social media accounts, phone numbers, or any combination thereof. The shipping address database can be used to pre-fill recipient shipping address on the recipient interface module 204. The shipping address database can be used for tax or shipping cost estimations. The analytics module 234 can determine a certainty level of each shipping address. The aggressiveness of using the stored shipping addresses in the buyer and recipient interfaces can be adjusted based on the certainty level.

The gift transaction system 200 includes a security module 240. The security module 240 is configured to prevent fraud associated with the gift transaction. The security module 240 can be coupled to the recipient interface module 204 to authenticate the recipient by email account access or social media service sign-in. The buyer and/or the recipient can also authenticate in other explicit or implicit manners, such as passphrase, secret questions or shared experience questions. The security module 240 can also limit frequency of receiving or sending of gifts. The security module 240 can also cross check gift transaction geolocations to ensure that the gift transactions occur consistently geographically. When an inconsistency is detected, the gift transaction is halted pending an investigation.

Other fraud prevention mechanisms can include: (a) detecting, rejecting, or flagging internet protocol (IP) addresses that belong to proxies and anonymizers; (b) verifying geographical location via IP address of the recipient is within the same region as the shipping address; (c) ensuring that all requests around a gift transaction come from the same physical region, such as via IP-based geographical location; (d) cross-referencing billing address with the buyer's IP-based geographical location; (e) verifying contact points, such as email addresses or social media accounts, to ensure that they are not newly created; (f) ranking generic email addresses (e.g., free accounts like @yahoo.com and @gmail.com) lower than corporate addresses in terms of security risk; (g) cross-referencing the buyer account and the recipient account on social media systems and verifying that the social media accounts are filled with real-life content; (h) verifying via phone call or SMS message; (i) detecting patterns across all gift transactions including situations where many different gift transactions correspond to the same credit card, same physical address, same recipient, same sender, or same email address/credentials; (j) generating gift-based social network based connections made via gift transactions between buyer and recipient and flagging new corners to the gift-based social network as potential fraudulent buyer or recipient, or any combination thereof.

In some embodiments of the gift transaction system 200, gift transactions can occur based on unverified mailing addresses and unverified credit card information. This may expose the system to fraud and abuse. The fraud prevention mechanisms provided by the security module 240 can minimize the possibility of abuses and fraudulent transactions. Based on various fraud prevention mechanisms, a gift transaction could be approved, flagged for additional automatic verification (e.g., additional email required or phone number verification), flagged for manual verification, or rejected.

The gift transaction system 200 includes a payment module 242. The payment module 242 is configured to charge fees associated with gift transactions. The payment module 242 can charge a premium fee per package sent from the buyer. The payment module 242 can charge a fee per gift transaction or up-sale transaction from the merchants via the merchant backend interface module 216. The payment module 242 can charge a fee from a payment processor service per gift transaction. The payment module 242 can charge a fee from the shipping provider. The payment module 242 can also charge a one-time fee to integrate the gift transaction system 200 to a third-party service.

The payment module 242 can be coupled to third-party e-commerce platforms for payment processing and accounting amongst the buyer, the merchant, the payment processors, and the gift transaction system 200. The payment module 242 can be link the final payment of the gift items to the merchant account for ease of integration.

The gift transaction system 200 can include a gift list store 244. The gift list store 244 is configured to store wish-lists of users and gift-lists of users. The gift-lists allow the buyer to keep track of ideas for gifts. The wish-lists allow the curation module 224 to make accurate recommendations to the buyers for things on the recipient wish list. The wish list can also serve to replace the traditional use of gift registries. The recipient can publish a wish list. All gift buyers can obligate themselves to gift items on the list. When the gift items are sent, the recipient can review the sent gifts and make any exchanges on the sent gift list. Once all gifts are accepted or exchanged, then the gift buyers can make the payments. The wish lists and the gift lists can be merchant specific or across multiple merchants.

The techniques introduced in the modules herein can be implemented by programmable circuitry programmed or configured by software and/or firmware, or they can be implemented by entirely by special-purpose "hardwired" circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Figure 3:
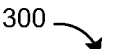
FIG. 3 illustrates an example of a method of facilitating a gift sending transaction via a gift transaction system.
Figure 3:
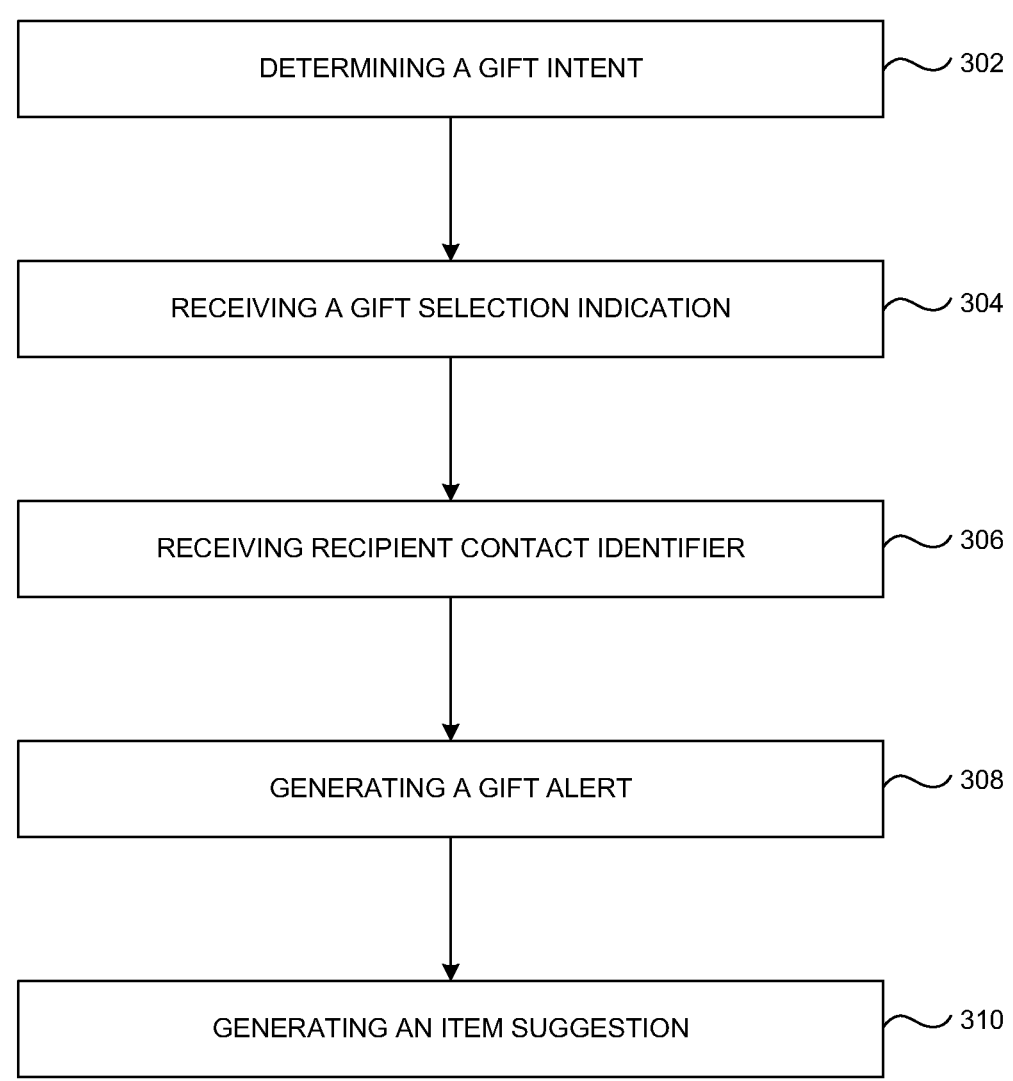

FIG. 3 illustrates an example of a method 300 of facilitating a gift sending transaction via a gift transaction system, such as the gift transaction system 102 of FIG. 1. The method 300 can begin with determining gift intent based on a buyer input at a step 302. The gift intent can be determined by registering a click of a link in an email reminder, registering a click on a mobile phone application, shopping at a merchant store front in a gift mode, or any combination thereof. The buyer is allowed access to one or more merchant store to review items provided by the merchant. The gift intent can include a buyer contact entry indicating how the buyer can be contacted, such as an email address or an account identifier. A link or button to send gifts can be integrated on specific product pages of the merchant store front. A link or button to send gifts can be integrated with the checkout process of the merchant store front to send contents of shopping cart as gifts. The buyer interface can detect approaching shopping cart abandonment by calculating delay in purchase process as well as comparing buyer behavior trends. Once approaching shopping cart abandonment is detected, the gift transaction system can be offered as a solution to complete a transaction without shipping address or payment or actual inventory of the gift item. However, the buyer can still have the option of putting in the shipping address and making the payment via the buyer interface.

At a step 304 of the method 300, the gift transaction system can receive a gift selection indication. The gift selection indication can be a product identifier, such as a UPC code, together with a merchant identifier. The gift selection indication can also be a set of product identifiers from the same merchant indicating a same-store gift bundle. The gift selection indication can further be a set of product identifiers from different partner merchants indicating a global gift bundle. The buyer interface can facilitate the gift selection process by making recommendations, gift suggestions, and gift bundle suggestions. These recommendations can be provided by the curation module 224 of FIG. 2.

When multiple gift selections are indicated, the gift selections can be organized in a gift basket, similar to a shopping cart that assembles gifts for sending. Alternatively, the gift selections can be organized in a shopping cart where the multiple gifts can be paid as a group.

As part of the gift selection process, the buyer can select one or more gift alternatives. The gift alternatives can be selected by the recipient instead of the originally selected gift item made by the buyer. The buyer can be charged for the gift alternatives when accepted. The stored credit for the exchange process can be based on the price of the originally selected gift. The buyer may be prompted to select alternative or additional gifts from sources outside the original online merchant.

Once the gift is selected, the buyer can be prompted to input a recipient contact on a buyer interface, such as the buyer interface generated by the buyer interface module 202 of FIG. 2. At a step 306 of the method 300, the gift transaction system can receive a recipient contact identifier. The recipient contact identifier can include an email address, a social media account, an alias name in a social media network or virtual game, or any combination thereof. Then, the method 300 includes generating a gift alert of a gift transaction based on the recipient contact identifier and the gift selection indication at a step 308. The gift alert can be or provide access to an interactive gift notification in the form of a recipient interface generated by the recipient interface module 204 of FIG. 2.

The gift alert can be generated as a confirmation of the gift transaction being created. Alternatively, a separate confirmation page can be generated on the buyer interface. Photos, videos, stories, interactive multimedia applications of the merchant or of the gift item can be included in the gift alert. The product tutorial and user guide can also be included in the gift alert.

The gift alert can include sending an email, generating a printable page depicting the gift selection, sending a SMS message, sending a social network message, or any combination thereof. The gift alert can also be sent from one mobile device to another mobile device using a mobile application such as Bump™.

The printable instance of the gift alert can be printed at home or printed professionally and shipping to the recipient. Pre-made gift pages can be used as the gift alert. For example, a barcode of the pre-made gift page can be registered with the gift transaction system 102. For another example, a bar code of a particular gift transaction can be filled in on the pre-made gift page. The gift alert can include greeting card templates, animation templates, audio templates, personal videos, personal photos, personal audio, or any combination thereof. After the gift alert has been sent, the merchant backend interface module 216 of FIG. 2 can place a soft hold on the gift item. The soft hold can have an expiration time after which the gift item from the merchant can be purchased by someone else.

Optionally, after the gift alert is sent, the method 300 can include generating an item suggestion based on the gift transaction at a step 310. The item suggestion can be based on an account identity of the buyer, such as a preference profile associated with the buyer account identify. The item suggestion can be based on the gift selection indication. The item suggestion can be based on the recipient contact identifier, such as a preference profile associated with the recipient contact identifier. The item suggestion can be a suggestion to create a further gift transaction with the same recipient or to create a further gift transaction with a different recipient. The item suggestion can also be an up-sale advertisement to suggest an item for the buyer himself or herself.

Optionally, in response to generating the gift alert, the method 300 can also include generating a recipient suggestion. The recipient suggestion can be based on the buyer account identity. The recipient suggestion can be coupled together with the item suggestion. The recipient suggestion can be based on a social media network associated with the buyer account identity.

Figure 4:
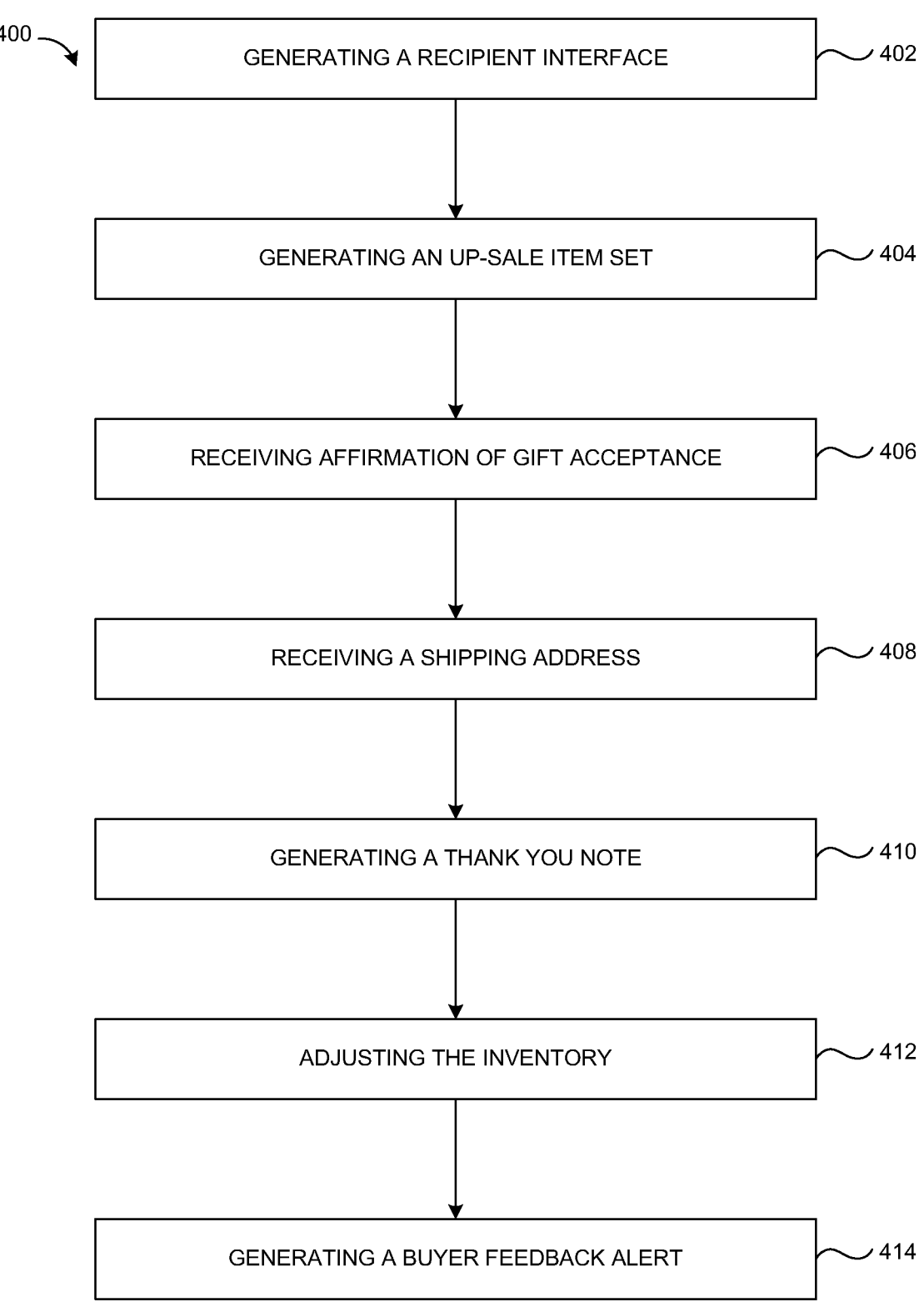
FIG. 4 illustrates an example of a method of facilitating a gift acceptance via a gift transaction system.

FIG. 4 illustrates an example of a method of facilitating a gift acceptance via a gift transaction system, such as the gift transaction system 102 of FIG. 1. The method 400 can begin with a step 402 of generating a recipient interface to affirm an acceptance of a gift on a client device. The recipient interface can include a multimedia representation of the gift, a buyer identifier, a gift note, or any combination thereof. The recipient interface can be triggered via a link accessible through a client device with networked capability to access the gift transaction system 102. The link can be stored in an electronic message or can be entered manually on an Internet browser. Optionally, the method 400 can include a step 404 of generating an up-sale item set. The up-sale item set can be generated based on the recipient identity. The up-sale item set can be based on the gift. The up-sale item set can be based on a buyer identity of the gift. The up-sale item set can be drawn from the originating merchant store, from one of the merchant store providers/ suppliers, or other merchant stores compatible with the gift transaction system 102.

Upon reviewing the recipient interface, the recipient can either choose to accept the gift, exchange the gift, or reject the gift. For example, in a step 406, the method 400 can include receiving an affirmation of gift acceptance via the recipient interface. Receiving the affirmation can include receiving the affirmation with customization of the gift, such as specified size, color, engravement, other customizations, or any combination thereof.

Following the affirmation, the method 400 includes receiving a shipping address via the buyer interface in a step 408. The shipping address can be pre-filled from a previous transaction, from a social media service account, or from a browser cookie. Following the affirmation, the method 400 can also include generating a thank you note for the buyer in a step 410. In response to receiving the shipping address, the method 400 can follow with a step 412 of adjusting the inventory at a merchant system. The actual gift items can be shipped after the buyer has confirmed payment. When a gift bundle has been accepted, the gift transaction system 102 can coordinate delivery of the gift items from various merchants such that the gift items arrive together in a bundle. A soft hold on the gift item can be place on a merchant system via the merchant backend interface module 216 of FIG. 2 once the shipping address has been provided.

Also in response to receiving the shipping address, the method 400 can follow with a step 414 of generating a buyer feedback alert to the buyer based on a buyer contact entry stored on the gift transaction system. The feedback alert can include the thank you note generated in the step 410. The feedback alert can include a link for the buyer to make payment for the accepted gift. In at least one embodiment, the step 412 can be in response to receiving payment for the gift instead of in response to receiving the shipping address. At any point throughout the steps of the method 400, the method 400 can include generating an item suggestions set. The item suggestions set can include a list of potential people that the current recipient can send a gift to. The item suggestions set can include a list of potential items to purchase from the merchant that the gift is purchased from. The items suggestions set can include a calendar of social events recorded on a social media network where a gift giving opportunity is relevant.

Figure 5:
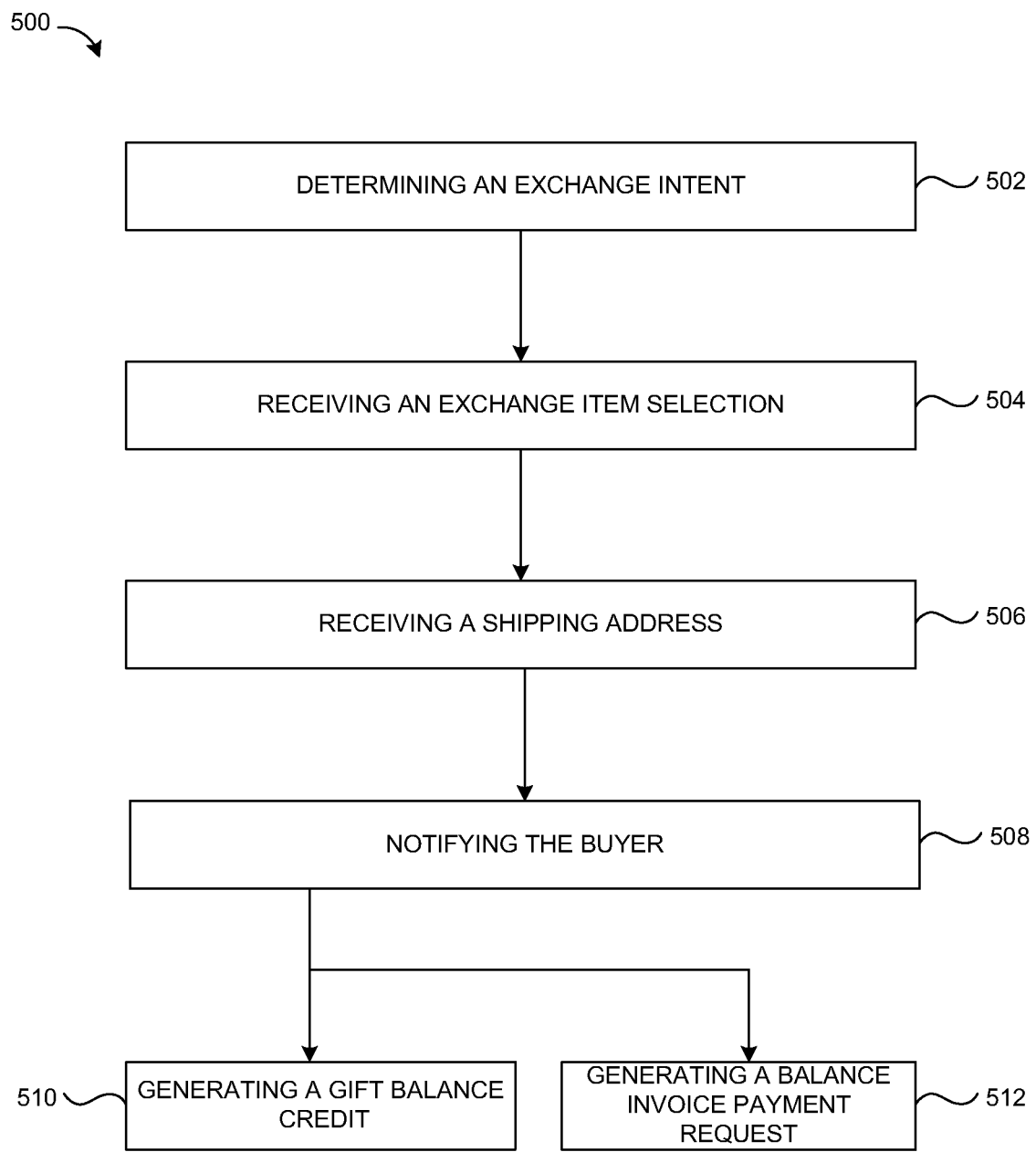
FIG. 5 illustrates an example of a method of facilitating a gift exchange via a gift transaction system.

FIG. 5 illustrates an example of a method of facilitating a gift exchange via a gift transaction system, such as the gift transaction system 102 of FIG. 1. The method 500 can begin with a step 502 of determining an exchange intent to exchange an original gift selection. The exchange intent can be determined by receiving an interaction with the recipient interface generated in the step 402 of FIG. 4, such as the interface generated by the recipient interface module 204 of FIG. 2. For example, the exchange intent can be determined based on the recipient clicking an exchange mode button on the recipient interface. For another example, the exchange intent can be determined based on the recipient browsing a merchant website and clicking on an exchange button indicating the newly selected item is to be traded with a pending gift.

The method 500 then follows with a step 504 of receiving an exchange item selection via the recipient interface. The recipient may be prompted to select additional or alternative gifts from sources outside the original online merchant. The exchange item selection can be a set of multiple items, from either the same merchant as the original gift or from different merchants. If the original gift was a set of multiple items, the exchange item selection does not have to be the same number of items (i.e., can be less or more items). The original price of the gift serves as stored credit, where the exchange items can be selected without further payment if the price of the exchange item is lower than the original price. The recipient interface over the merchant store front can modify the merchant store front such that the original price of the gift is not revealed even during exchange. The price of potential exchange items can also be redacted from the merchant store front, and only an indication of whether a charge-free exchange can be made is revealed on the recipient interface.

The gift transaction system 200 can provide an interface for a merchant store to define an exchange network with other merchant stores, where gift items from one merchant within the exchange network can be exchanged with gift items from another merchant on the exchange network. Other merchant stores can opt into the exchange network after the exchange network is created. The gift items from the exchange network can be prioritized by the curation module 224 such that a number of gift items from alternative merchants on the exchange network are presented to a recipient seeking to exchange an originally received gift item. The merchant store closing the gift transaction (i.e., the merchant store paid by the gift transaction) can be debited a referral fee to be credited to the referring merchant store of the original gift item that was exchanged for a gift item of the closing merchant store.

Upon receiving the exchange item selection, the method 500 also includes a step 506 of receiving a shipping address for the delivery of the exchange item selection. Upon confirming the exchange item selection and receiving the shipping address, the method 500 follows with notifying the buyer based on a buyer contact entry stored on the gift transaction system in a step 508. Depending on the price of the exchange item selection and the price of the original gift selection, the method 500 can also include a step 510 of generating a gift balance credit or a step 512 of generating a balance invoice payment request. The step 510 is executed by the gift transaction system when the price of the exchange item selection is smaller than the price of the original gift selection. The gift balance can be stored as a merchant store credit, a gift card, or a multi-merchant store credit for merchants compatible with the gift transaction system 102. A gift card identifier can be generated and stored on the gift transaction system. The step 512 is executed by the gift transaction system when the price of the exchange item selection is greater than the price of the original gift selection.

Figure 6:
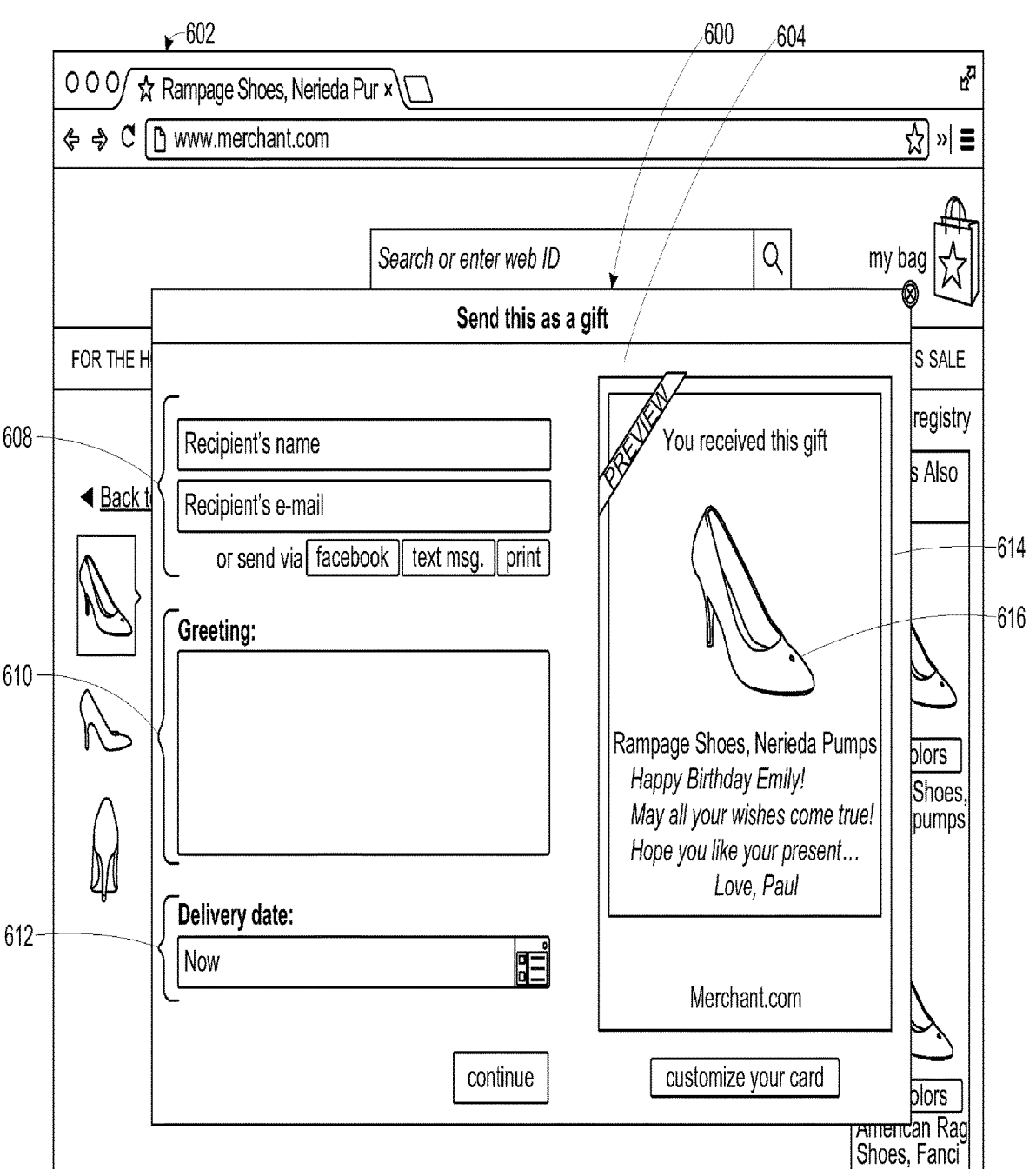
FIG. 6 illustrates an example of a buyer interface embedded in a merchant website in a gift customization page.

FIG. 6 illustrates an example of a buyer interface 600 embedded in a merchant website 602 in a gift customization page 604. The buyer interface 600 can be activated via a browser-side script, such as JavaScript, that is part of the merchant website 602. The buyer interface 600 can include one or more pages each with different elements and functionalities to facilitate the buyer from sending a gift to at least a recipient. It has been illustrated that the buyer interface 600 is divided into different pages. However, it is understood that different elements of the buyer interface 600 can be divided differently into other pages, or elements of the existing pages can be combined into a single page.

In this example, the gift customization page 604 includes a recipient contact entry 608, a greeting note 610, a delivery constraint 612, a gift card section 614 including a gift icon 616, or any combination thereof. The recipient contact entry 608 is where the buyer can input the recipient name and the recipient contact information, such as email address, social network message, or cellular text message. The recipient contact entry 608 can be just the recipient name if the buyer selects the option to print out a gift card notifying the recipient of the gift. The greeting note 610 is where the buyer can input a message to be sent to the recipient along with a notification of the gift. The delivery constraint 612 is where the buyer can input a delivery constraint on the gift transaction. The delivery constraint 612 may include an expiration date of the gift, where past the expiration date the recipient would not be able to accept the gift. The delivery constraint 612 may also include a delivery date of the notification of the gift to the recipient.

The gift card section 614 is generated by the gift transaction system 102 of FIG. 1 as a decorated printable card to send to the recipient. The gift card section 614 can include the gift icon 616. The gift icon 616 is a representation of the gift or set of gifts to be sent by the buyer. The gift icon 616 can be an image, an animation, or an interactive multimedia object, such as an interactive image capable of being zoomed or rotated. The location of elements in the gift card section 614, the text within the gift card section 614, font size and style of various texts in the gift card section 614 are all customizable via the buyer interface 600. The buyer interface 600 can include templates to customize the gift card section 614. The gift card section 614 can be formatted to be printable into various standard gift card sizes.

Figure 7:
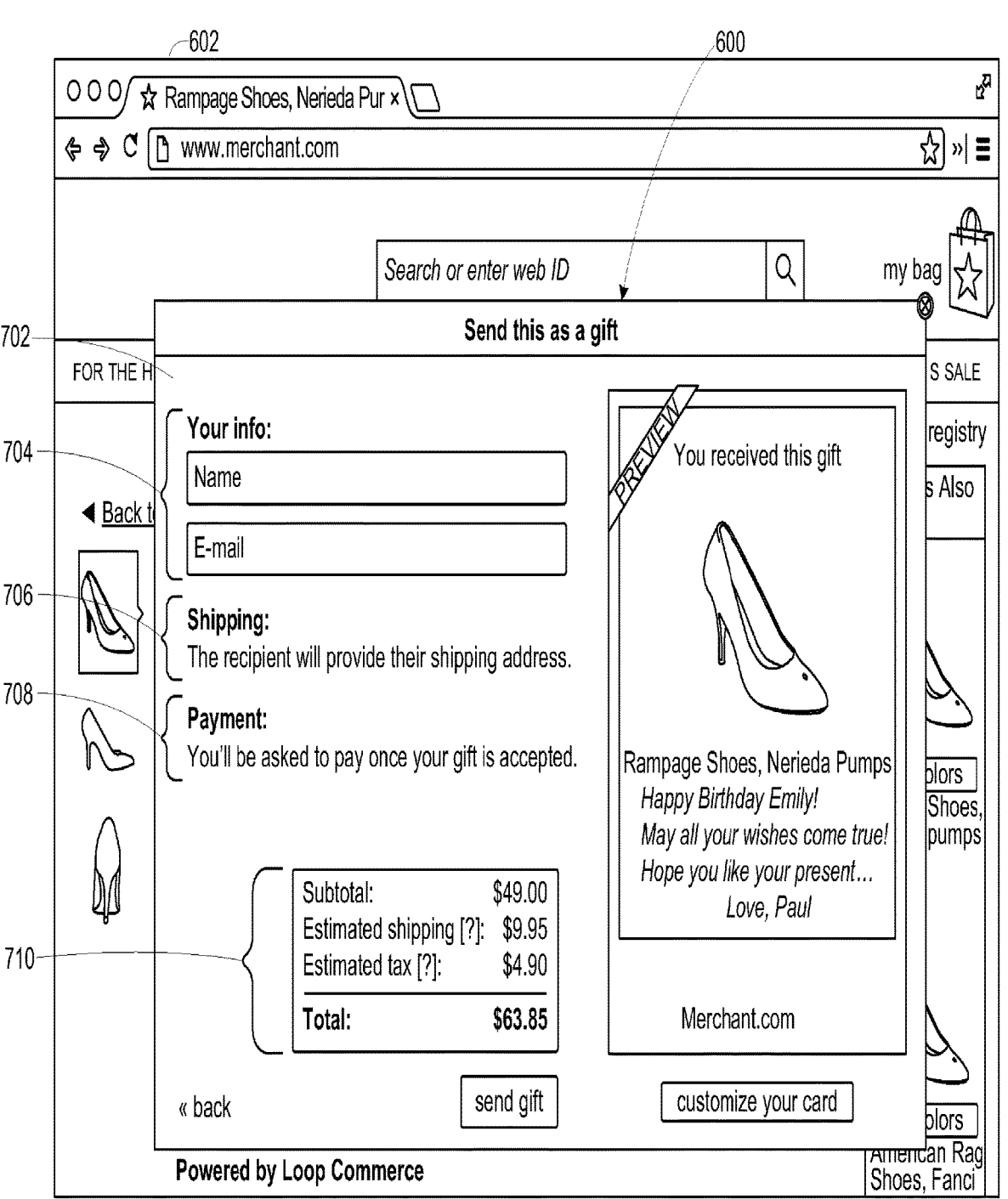
FIG. 7 illustrates an example of the buyer interface embedded in the merchant website in a buyer information page.

FIG. 7 illustrates an example of the buyer interface 600 embedded in the merchant website 602 in a buyer information page 702. The buyer information page 702 includes a buyer contact entry 704. The buyer contact entry 704 is where the buyer can input his own name and contact information. The buyer name can be used to generate the gift card section 614 of FIG. 6. The buyer contact information is used to close the gift transaction when the recipient accepts the gift. Optionally, the buyer information page 702 can include a shipping information section 706 and a payment information section 708. The shipping information section 706 can alert the buyer that the recipient will provide the shipping address. Alternatively, the buyer has the option of providing the shipping address at the shipping information section 706. The payment information section 708 can alert the buyer that the payment transfer would be completed after the recipient accepts the gift. Alternatively, the buyer has the option of providing the payment information to complete the gift transaction.

The buyer information page 702 can also include an estimation section 710. The estimation section 710 estimates the cost of the gift for the buyer. For example, the buyer interface module 202 can determine an estimation of shipping cost and an estimation of tax. The estimation of shipping cost and tax can be facilitated by the merchant backend interface module 216 of FIG. 2 where the merchant system 212 of FIG. 2 can provide the cost estimations based on destination regions. The buyer has the option of putting down the resident state of the recipient to help aid in the cost estimation. Cost estimation can also be based on geo-targeting, social graph data, explicit hints from the buyer or the recipient, previous addresses, or any combination thereof. Once the buyer information page 702 is completed, the buyer can click on a send gift button to either immediately deliver the gift notification to the recipient or deliver the gift notification at a scheduled time based on the delivery constraint 612 of FIG. 6.

Figure 8:
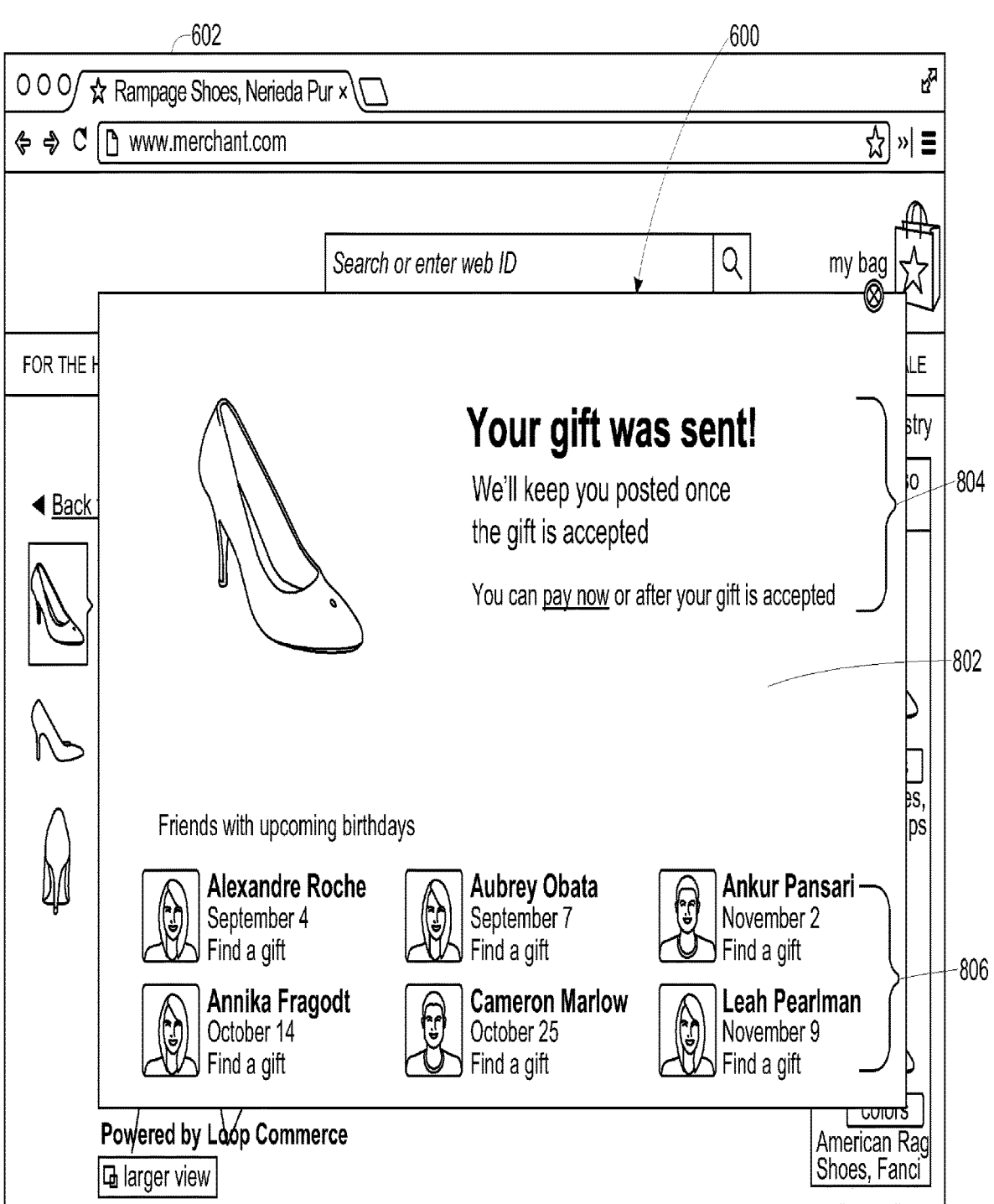
FIG. 8 illustrates an example of the buyer interface embedded in the merchant website in a gift confirmation page.

FIG. 8 illustrates an example of the buyer interface 600 embedded in the merchant website 602 in a gift confirmation page 802. The gift confirmation page 802 includes a confirmation message 804 indicating that the gift has been sent or has been scheduled to be sent. The gift confirmation page 802 can also include an up-sale section 806. The up-sale section 806 can remind the buyer of upcoming social events that may warrant a gift giving occasion, such as birthdays, anniversaries, religious holidays, national holidays, other social events registered on a social media website, or any combination thereof.

Figure 9:
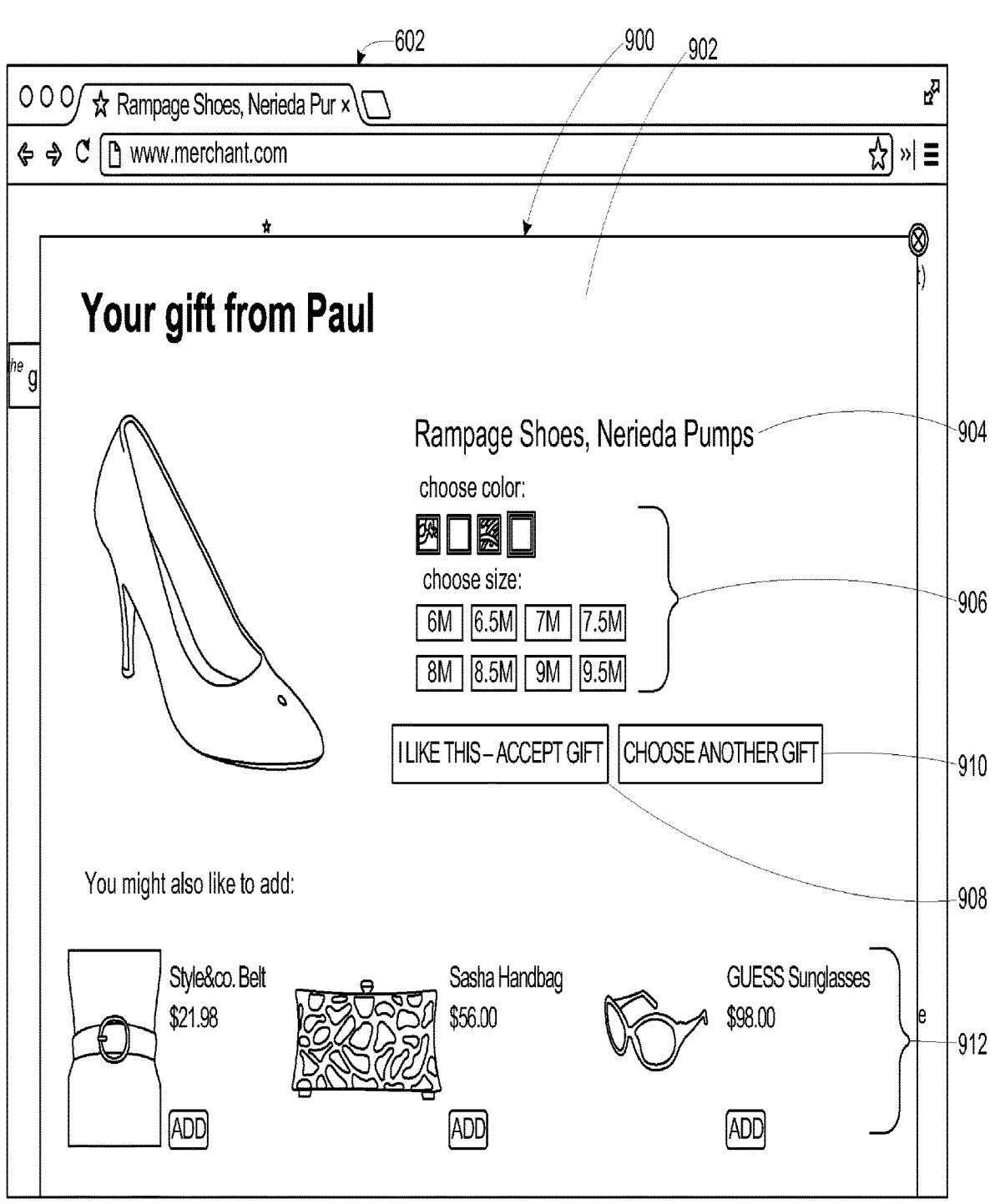
FIG. 9 illustrates an example of a recipient interface embedded in the merchant website in a gift alert page.

FIG. 9 illustrates an example of a recipient interface 900 embedded in the merchant website 602 in a gift alert page 902. The recipient interface 900 can be activated via a browser-side script, such as JavaScript, that is part of the merchant website 602. The recipient interface 900 can include one or more pages each with different elements and functionalities to facilitate the recipient from responding to a gift sent from at least one buyer. It has been illustrated that the recipient interface 900 is divided into different pages. However, it is understood that different elements of the recipient interface 900 can be divided differently into other pages, or elements of the existing pages can be combined into a single page.

In the gift alert page 902, a recipient is notified of a gift from a buyer. The gift alert page 902 includes a gift description section 904. The gift description section 904 can include a text or a multimedia description of the gift or bundle of gifts being sent. The multimedia description can include a graphical icon, a photograph, an interactive image, a video, or any combination thereof. The gift alert page 902 can also include a gift variant selection section 906. The gift variant selection section 906 can include an interactive element to allow the recipient to select different variants of the gift. For example, the variants can be customization of color and size.

The recipient via the gift alert page 902 of the recipient interface 900 can accept the gift via an acceptance button 908. The recipient can also exchange the gift via an exchange button 910. The gift alert page 902 can further include an item addition section 912. The item addition section 912 is generated by the recipient interface 900 based on a profile of the recipient facilitated by the merchant backend interface module 216 of FIG. 2. The item addition section 912 can present other items for the recipient to purchase from the merchant in addition to accepting the gift from the same merchant.

Figure 10:
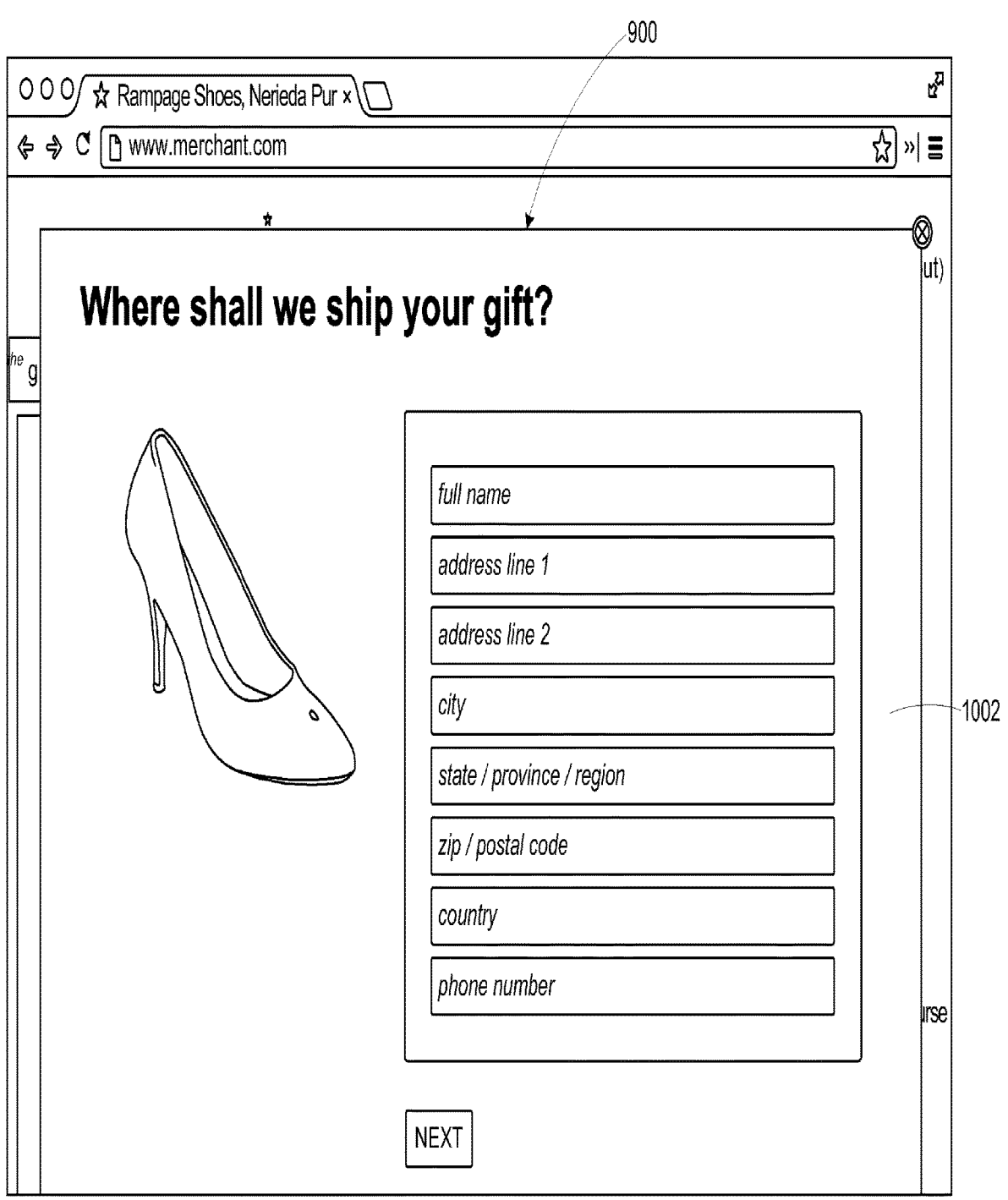
FIG. 10 illustrates an example of the recipient interface embedded in the merchant website in a gift shipment page.

FIG. 10 illustrates an example of the recipient interface 900 embedded in the merchant website 602 in a gift shipment page 1002. The gift shipment page 1002 includes an interface to input shipping address for the gift. The gift shipment page 1002 allows the recipient to change the shipping/delivery address even if the buyer has specified a shipping address already.

Figure 11:
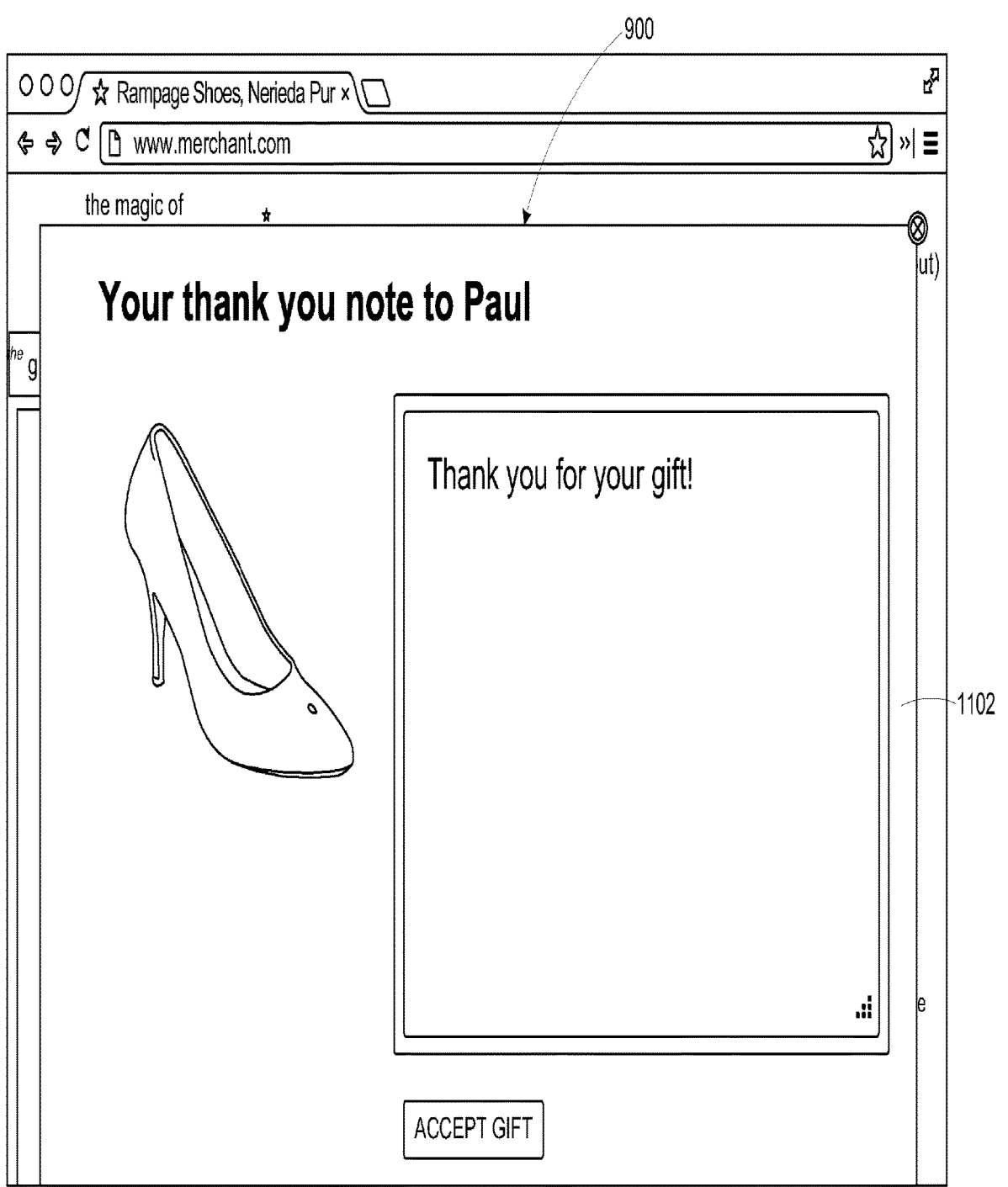
FIG. 11 illustrates an example of the recipient interface embedded in the merchant website in a note page.

FIG. 11 illustrates an example of the recipient interface 900 embedded in the merchant website 602 in a note page 1102. The note page 1102 can receive inputs from the recipient to denote a thank you note to the buyer for the gift. The recipient can customize the thank you note including responding with a gift transaction of his/her own. The thank you note can include text, video, photo, audio, formatted greeting card, or any combination thereof.

Figure 12:
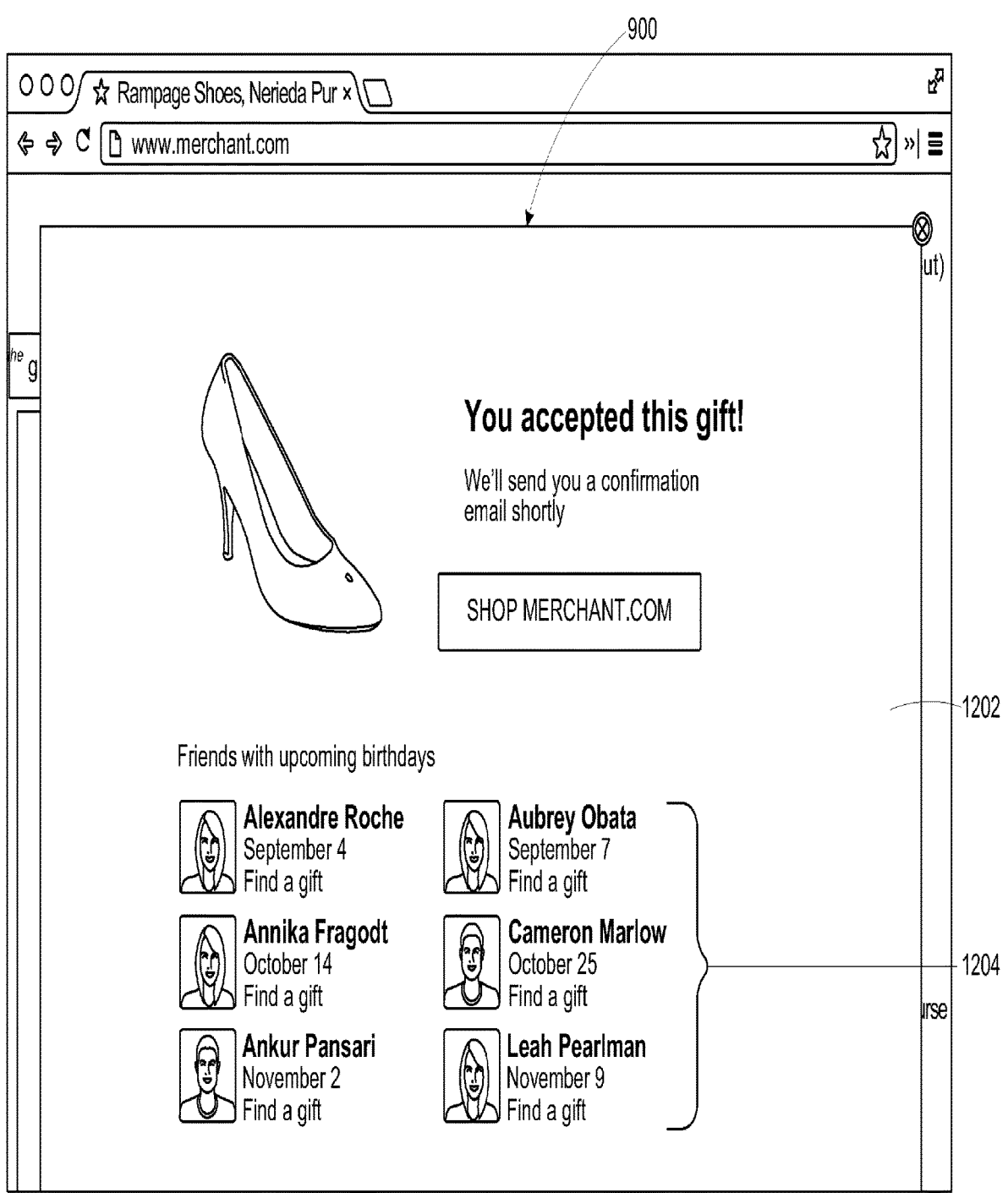
FIG. 12 illustrates an example of the recipient interface embedded in the merchant website in an acceptance confirmation page.

FIG. 12 illustrates an example of the recipient interface 900 embedded in the merchant website 602 in an acceptance confirmation page 1202. The acceptance confirmation page 1202 notifies the recipient that the gift from the buyer has been accepted. Once the gift has been accepted, the gift transaction system 102 can notify the merchant system 104 to place a reserve hold on the gift item via the merchant back end interface. Also in response to the gift being accepted, the gift transaction system 102 can notify the buyer to authorize payment based on the buyer contact entry 704 of FIG. 7.

The acceptance confirmation page 1202 can include a gift suggestion section 1204. The gift suggestion section 1204 can include links to send gifts to a list of friends (i.e., user accounts socially connected to the recipient) of the recipient through the gift transaction system 200 of FIG. 1.

Figure 13:
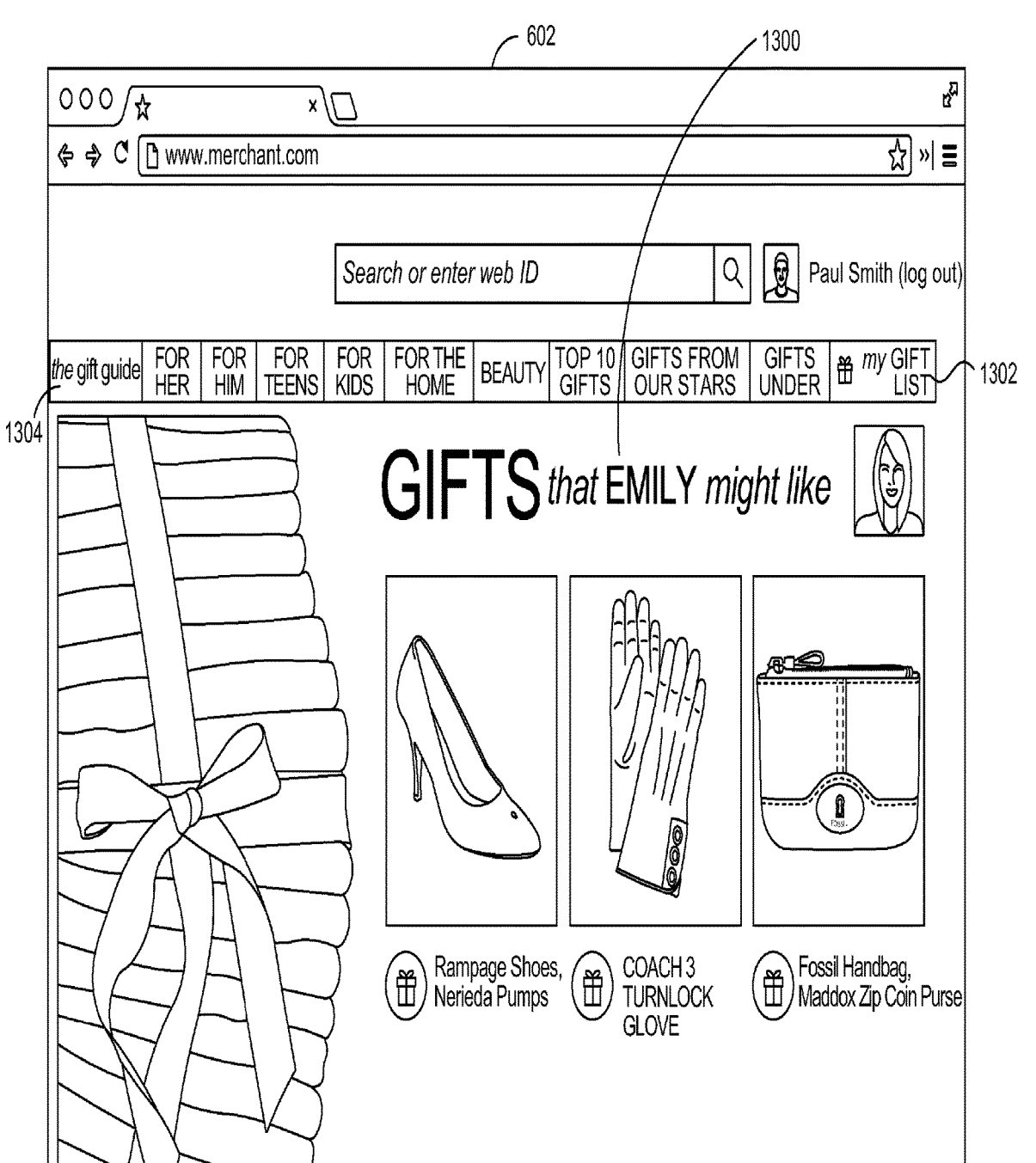
FIG. 13 illustrates an example of an up-sale interface embedded in the merchant website.

FIG. 13 illustrates an example of an up-sale interface 1300 embedded in the merchant website 602. The up-sale interface 1300 can be used to suggest potential gifts to a buyer. The up-sale interface 1300 can be curated by the curation module 224 of FIG. 2, where a recommendation feed is generated via the curation module 224 and assisted by profiling information from the analytics module 234 of FIG. 2.

The up-sale interface 1300 can include a gift list 1302, such as the gift lists stored on the gift list store 244 of FIG. 2. The gift list 1302 enables a potential buyer of a gift to keep track of gift ideas. The up-sale interface 1300 can also include a gift guide 1304. The gift guide 1304 includes different lists of gift recommended by either the merchant system 212 of FIG. 2 or the curation module 224.

Figure 14:
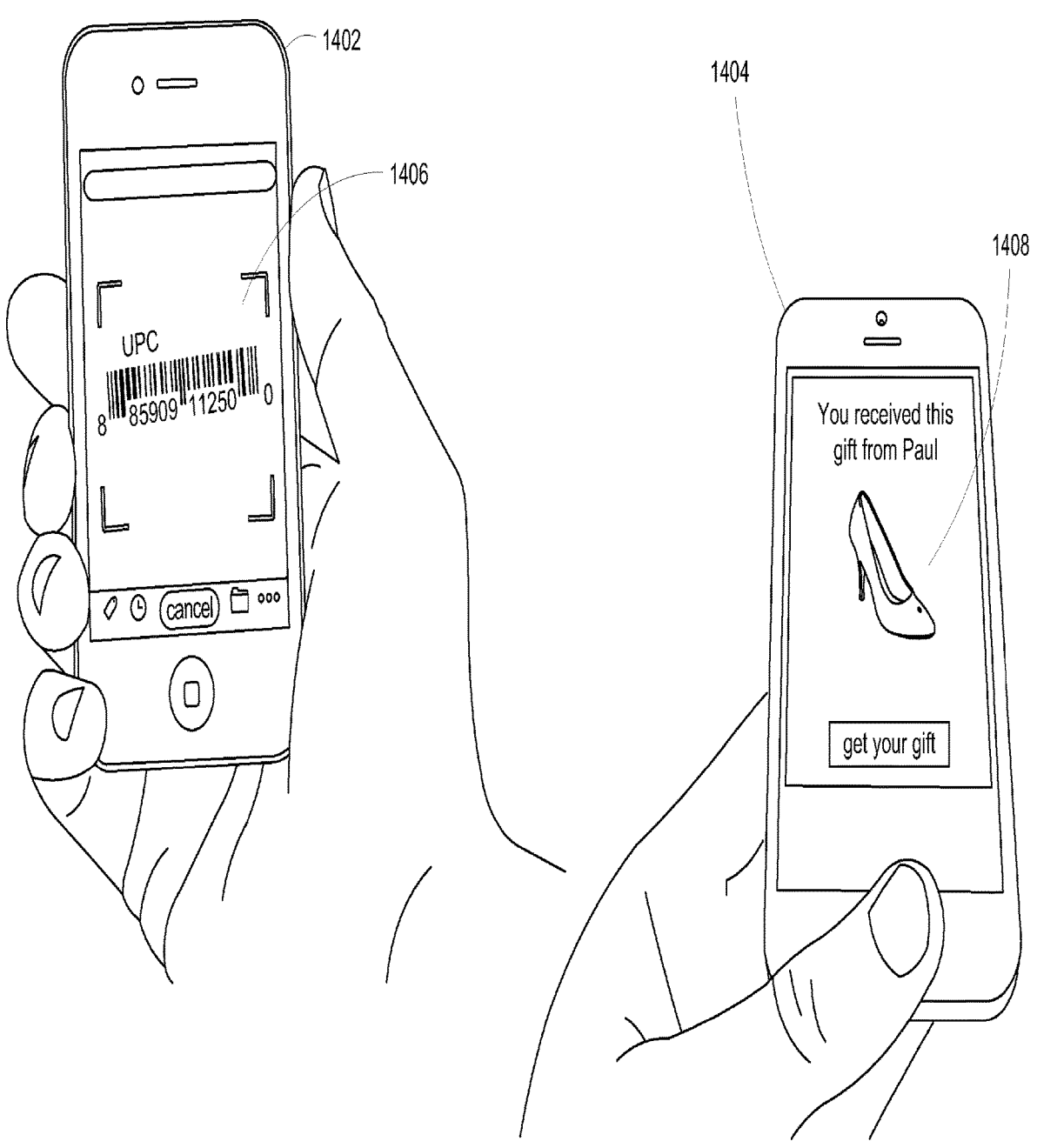
FIG. 14 is an illustration of a method of sending a gift via a buyer device and a recipient device.

FIG. 14 is an illustration of a method of sending a gift via a buyer device 1402 and a recipient device 1404. The buyer device 1402 can identify a target gift 1406 by a camera, such as taking a picture of the UPC code. Through the gift transaction system 102 of FIG. 1, the buyer device 1402 can instantly generate a gift card to send to the recipient device 1404. The recipient device 1404, having received the gift card, can then accept, exchange, or customize the target gift 1406.

Figure 15:
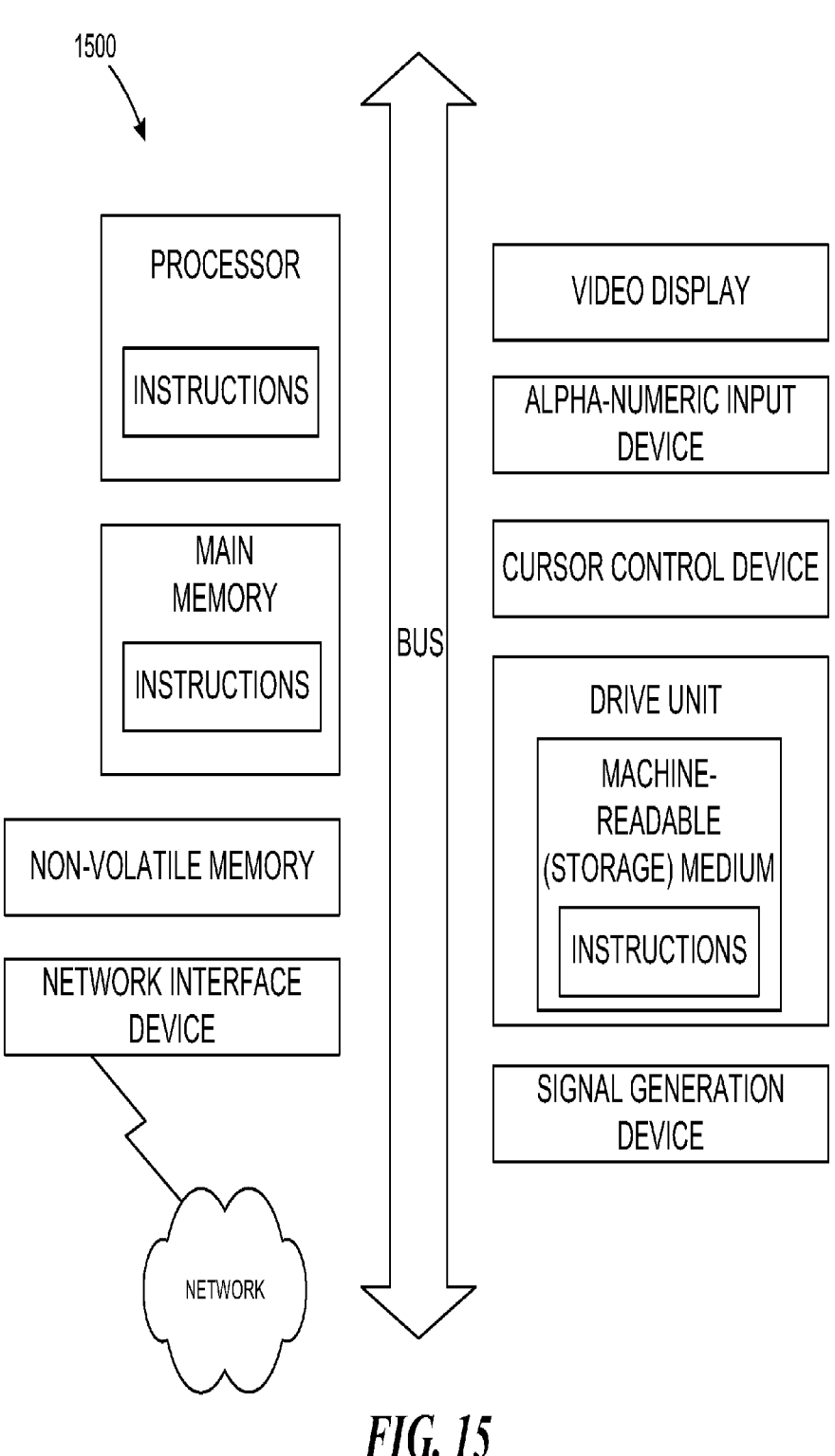
FIG. 15 is a diagrammatic representation of a machine in the example form of a computer system within which a set of instructions, for causing the machine to perform any one or more of the methodologies or modules discussed herein, may be executed.

FIG. 15 illustrates an example of a computer system 1500. The computer system 1500 includes a processor, memory, non-volatile memory, and an interface device. Various common components (e.g., cache memory) are omitted for illustrative simplicity. The computer system 1500 is intended to illustrate a hardware device on which any of the components depicted in the example of FIGS. 1 and 2 (and any other components described in this specification) can be implemented. The computer system 1500 can be of any applicable known or convenient type. The components of the computer system 1500 can be coupled together via a bus or through some other known or convenient device.

This disclosure contemplates the computer system 1500 taking any suitable physical form. As example and not by way of limitation, computer system 1500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 1500 may include one or more computer systems 1500; be unitary or distributed; span multiple locations; span multiple machines; or reside in a cloud, which may include one or more cloud components in one or more networks. Where appropriate, one or more computer systems 1500 may perform without substantial spatial or temporal limitation one or more steps of one or more methods described or illustrated herein. As an example and not by way of limitation, one or more computer systems 1500 may perform in real time or in batch mode one or more steps of one or more methods described or illustrated herein. One or more computer systems 1500 may perform at different times or at different locations one or more steps of one or more methods described or illustrated herein, where appropriate.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 1500. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 1500. The interface can include an analog modem, ISDN modem, cable modem, token ring interface, satellite transmission interface (e.g., "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 15 reside in the interface.

In operation, the computer system 1500 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™. operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting the invention to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

Those of skill in the art will appreciate that the invention may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative embodiments may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112, 16 will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method, comprising:
receiving a selection input corresponding to a selection of an interface element to navigate to a digital storefront of a merchant system, wherein the interface element is selected from a plurality of interface elements and is generated using an Application Programming Interface (API) of an application associated with the interface element;
determining, based on the selection input, a gift intent, wherein the gift intent is an intent to send a gift;

receiving an intent input via the interface element, the intent input corresponding to a selection of a gift item, wherein the intent input is associated with the gift intent;
providing, based on analysis of the intent input, a user interface that includes a representation of the gift item and an option to select a customization for the gift item;
receiving a customization input that determines an aspect of the gift item;
using the API to facilitate access to an inventory database corresponding to the merchant system, wherein the merchant system includes the representation of the gift item;
integrating a buyer interface within the digital storefront of the merchant system;
providing, using the API, the representation of the gift item and the customization input, wherein the gift item is described by analytics and is determined from behavior trend data stored in an analytics database;
receiving, via the buyer interface, an indication that the gift item is intended as the gift;
updating the analytics for the gift item using the indication;
receiving, via a recipient interface, an additional selection; and
in response to receiving the additional selection, initiating a gift transaction based on the gift item, the customization input, and the selection, wherein the gift transaction includes a checkout flow that modifies a checkout process of the merchant system to remove a shipping address from the checkout flow.

2. The computer-implemented method of claim 1, further comprising:
generating the buyer interface using the API, wherein the merchant system includes the representation of the gift item and information for customization options associated with the customization for the gift item.

3. The computer-implemented method of claim 1, further comprising:
receiving an initial selection input via the buyer interface, the initial selection input corresponding to an initial selection of the gift item, wherein when the user interface is displayed on a buyer device, the initial selection is facilitated using the user interface, and wherein the initial selection is generated using information from the inventory database;
receiving an exchange intent input corresponding to an exchange intent;
receiving an exchange selection input, the exchange selection input corresponding to a selection of an alternative gift; and
updating one or more analytics using the exchange intent input and the exchange selection input.

4. The computer-implemented method of claim 1, wherein a communication is received through the buyer interface and includes a contact point, wherein the recipient interface is generated using the contact point, and wherein the communication eliminates a sender provided shipping address for a recipient from the buyer interface.

5. The computer-implemented method of claim 1, wherein the checkout flow modifies the checkout process to remove a payment information question from the checkout flow and delay the payment information question until after a recipient accepts the gift item.

6. A system comprising:

a memory; and one or more processors coupled to the memory, the one or more processors configured by instructions in the memory to perform operations including:

receiving a selection input corresponding to a selection of an interface element to navigate to a digital storefront of a merchant system, wherein the interface element is selected from a plurality of interface elements and is generated using an Application Programming Interface (API) of an application associated with the interface element;

determining, based on the selection input, a gift intent, wherein the gift intent is an intent to send a gift;

receiving an intent input via the interface element, the intent input corresponding to a selection of a gift item, wherein the intent input is associated with the gift intent;

providing, based on analysis of the intent input, a user interface that includes a representation of the gift item and an option to select a customization for the gift item;

receiving a customization input that determines an aspect of the gift item;

using the API to facilitate access to an inventory database corresponding to the merchant system, wherein the merchant system includes the representation of the gift item;

integrating a buyer interface within the digital storefront of the merchant system;

providing, using the API, the representation of the gift item and the customization input, wherein the gift item is described by analytics and is determined from behavior trend data stored in an analytics database;

receiving, via the buyer interface, an indication that the gift item is intended as the gift;

updating the analytics for the gift item using the indication;

receiving, via a recipient interface, an additional selection; and in response to receiving the additional selection, initiating a gift transaction based on the gift item, the customization input, and the selection, wherein the gift transaction includes a checkout flow that modifies a checkout process of the merchant system to remove a shipping address from the checkout flow.

7. The system of claim 6, wherein the instructions configure the one or more processors for operations further comprising:

generating the user interface using the API, wherein the merchant system includes the gift item.

8. The system of claim 6, wherein the instructions configure the one or more processors for operations further comprising:

generating the buyer interface using the API, wherein the merchant system includes the representation of the gift item and information for customization options associated with the customization for the gift item.

9. The system of claim 6, wherein the instructions configure the one or more processors for operations further comprising:

receiving an initial selection input via the buyer interface, the initial selection input corresponding to an initial selection of the gift item, wherein when the user interface is displayed on a buyer device, the initial selection is facilitated using the user interface, and wherein the initial selection is generated using information from the inventory database;

receiving an exchange intent input corresponding to an exchange intent;

receiving an exchange selection input, the exchange selection input corresponding to a selection of an alternative gift; and updating one or more analytics using the exchange intent input and the exchange selection input.

10. The system of claim 6, wherein a communication is received through the buyer interface and includes a contact point, wherein the recipient interface is generated using the contact point, and wherein the communication eliminates a sender provided shipping address for a recipient from the buyer interface.

11. The system of claim 6, wherein the checkout flow modifies the checkout process to remove a payment information question from the checkout flow and delay the payment information question until after a recipient accepts the gift item.

12. A non-transitory computer readable storage medium comprising instructions that, when executed by one or more processors of a device, cause the device to perform operations comprising:

receiving a selection input corresponding to a selection of an interface element to navigate to a digital storefront of a merchant system, wherein the interface element is selected from a plurality of interface elements and is generated using an Application Programming Interface (API) of an application associated with the interface element;

determining, based on the selection input, a gift intent, wherein the gift intent is an intent to send a gift;

receiving an intent input via the interface element, the intent input corresponding to the selection of a gift item, wherein the intent input is associated with the gift intent;

providing, based on analysis of the intent input, a user interface that includes a representation of the gift item and an option to select a customization for the gift item;

receiving a customization input via the user interface, wherein the customization input determines an aspect of the gift item;

using the API to facilitate access to an inventory database corresponding to a merchant system, wherein the merchant system includes the representation of the gift item;

integrating a buyer interface within the digital storefront of the merchant system;

providing, using the API, the representation of the gift item and the customization input, wherein the gift item is described by analytics and is determined from behavior trend data stored in an analytics database;

receiving, via the buyer interface, an indication that the gift item is intended as the gift;

updating the analytics for the gift item using the indication;

receiving, via a recipient interface, an additional selection; and in response to receiving the additional selection, initiating a gift transaction based on the gift item, the customization input, and the selection, wherein the gift transaction includes a checkout flow that modifies a checkout process of the merchant system to remove a shipping address from the checkout flow.

13. The non-transitory computer readable storage medium of claim 12, wherein the instructions further cause the device to perform operations comprising:

generating the user interface using the API, wherein the merchant system includes the gift item.

14. The non-transitory computer readable storage medium of claim 12, wherein the instructions further cause the device to perform operations comprising:

generating the buyer interface using the API, wherein the merchant system includes the representation of the gift item and information for customization options associated with the customization for the gift item.

15. The non-transitory computer readable storage medium of claim 12, wherein the instructions further cause the device to perform operations comprising:

receiving an initial selection input via the buyer interface, the initial selection input corresponding to an initial selection of the gift item, wherein when the user interface is displayed on a buyer device, the initial selection is facilitated using the user interface, and wherein the initial selection is generated using information from the inventory database corresponding to the gift item;

receiving an exchange intent input corresponding to an exchange intent;

receiving an exchange selection input, the exchange selection input corresponding to a selection of an alternative gift; and updating one or more analytics using the exchange intent input and the exchange selection input.

16. The non-transitory computer readable storage medium of claim 12, wherein a communication received through the buyer interface includes a contact point, wherein the recipient interface is generated using the contact point, and wherein the communication eliminates a sender provided shipping address for a recipient from the buyer interface.

17. The non-transitory computer readable storage medium of claim 12, wherein the checkout flow modifies the checkout process to remove a payment information question from the checkout flow and delay the payment information question until after a recipient accepts the gift item.

* * * * *